United States Patent
Mikoshiba

(10) Patent No.: US 8,331,022 B2
(45) Date of Patent: Dec. 11, 2012

(54) REFLECTIVE SCREEN, PROJECTION SYSTEM, FRONT PROJECTION TELEVISION, AND REFLECTIVE SCREEN MANUFACTURING METHOD

(75) Inventor: Toshiaki Mikoshiba, Suwa (JP)

(73) Assignee: Seiko Epson Corporation (JP)

( * ) Notice: Subject to any disclaimer, the term of this patent is extended or adjusted under 35 U.S.C. 154(b) by 95 days.

(21) Appl. No.: 12/757,299

(22) Filed: Apr. 9, 2010

(65) Prior Publication Data

US 2010/0259818 A1    Oct. 14, 2010

(30) Foreign Application Priority Data

Apr. 10, 2009 (JP) ................................. 2009-096245
Mar. 8, 2010 (JP) ................................. 2010-050209

(51) Int. Cl.
*G03B 21/60* (2006.01)
(52) U.S. Cl. ........................ 359/459; 359/443
(58) Field of Classification Search .................. 359/443, 359/451, 455–457, 459; 264/2.5; 396/62
See application file for complete search history.

(56) References Cited

U.S. PATENT DOCUMENTS

| | | | | |
|---|---|---|---|---|
| 5,119,235 A * | 6/1992 | Umeda et al. ................ | 359/619 |
| 7,542,205 B2 * | 6/2009 | Poulsen ........................ | 359/452 |
| 7,864,420 B2 * | 1/2011 | Shinbo et al. ................ | 359/459 |
| 7,911,694 B1 * | 3/2011 | Katsuma et al. .............. | 359/459 |
| 8,023,186 B2 * | 9/2011 | Katsuma et al. .............. | 359/459 |
| 2005/0042423 A1 * | 2/2005 | Arai ............................. | 428/141 |
| 2005/0219691 A1 * | 10/2005 | Chubachi et al. ............. | 359/456 |
| 2006/0198020 A1 * | 9/2006 | Hannington .................. | 359/453 |
| 2008/0036922 A1 * | 2/2008 | Huber .......................... | 348/784 |
| 2009/0021828 A1 * | 1/2009 | Shinbo et al. ................ | 359/443 |
| 2009/0212011 A1 * | 8/2009 | Abe et al. ..................... | 216/52 |
| 2009/0231696 A1 * | 9/2009 | Shinbo et al. ................ | 359/459 |
| 2010/0157424 A1 * | 6/2010 | Katsuma et al. .............. | 359/455 |
| 2011/0188114 A1 * | 8/2011 | Shinbo et al. ................ | 359/459 |
| 2011/0249200 A1 * | 10/2011 | Shimizu ....................... | 348/744 |

FOREIGN PATENT DOCUMENTS

| | | | |
|---|---|---|---|
| JP | 2006-215162 | * | 8/2006 |
| JP | 2009-015196 | | 1/2009 |

* cited by examiner

*Primary Examiner* — Clayton E LaBalle
*Assistant Examiner* — Kevin Butler
(74) *Attorney, Agent, or Firm* — Harness, Dickey & Pierce, P.L.C.

(57) ABSTRACT

A reflective screen which reflects a projection light, includes: a substrate on one surface of which are formed a plurality of concavely or convexly curved surface portions; and a reflective film formed on the curved surface portions of the substrate, wherein the plurality of curved surface portions are configured of a plurality of kinds of curved surface portion differing in curvature, and curved surface portions, among a plurality of curved surface portions aligned in at least a first direction, which are of the same curvature are disposed in series of up to three.

8 Claims, 13 Drawing Sheets

REFLECTIVE SCREEN, PROJECTION SYSTEM, FRONT PROJECTION TELEVISION, AND REFLECTIVE SCREEN MANUFACTURING METHOD

BACKGROUND

1. Technical Field

The present invention relates to a reflective screen, a projection system, a front projection television, and a reflective screen manufacturing method.

2. Related Art

Heretofore, a reflective screen has been known which reflects a projection light of a projector or the like, making an image visible. Recently, a reflective screen has been proposed wherein optical characteristics have been improved by a structure in which a multitude of microlenses, that is, microscopic hemispherical concavities or convexities, are formed on a reflecting surface side, and a reflective film such as an aluminum film is formed thereon (for example, refer to JP-A-2009-15196).

With this kind of reflective screen, all of the hemispherical concavities or convexities are formed to the same size.

However, with the reflective screen of this kind of structure, while it is possible to improve the reflectance, there has been a problem in that a glare called a so-called scintillation (also called a speckle) occurs due to lights reflected from the concavities or convexities interfering with each other, and an image quality deteriorates.

SUMMARY

An advantage of some aspects of the invention is to provide a reflective screen, projection system, front projection television, and reflective screen manufacturing method wherein it is possible to prevent an occurrence of a scintillation, and display a high-definition image.

A reflective screen of one aspect of the invention, which reflects a projection light, includes a substrate on one surface of which are formed a plurality of concavely or convexly curved surface portions, and a reflective film formed on the curved surface portions of the substrate. The plurality of curved surface portions are configured of a plurality of kinds of curved surface portion differing in curvature, and curved surface portions, among a plurality of curved surface portions aligned in at least a first direction, which are of the same curvature are disposed in series of up to three.

The reflective screen of the aspect of the invention has the substrate on one surface of which are formed the plurality of concavely or convexly curved surface portions, and the reflective film formed on the curved surface portions of the substrate. Because of this, by appropriately designing the curved surface portions and reflective film, it is possible to efficiently reflect, in a front direction from the screen, the light projected onto one surface (a reflecting surface) of the screen on which the curved surface portions and reflective film are formed, and it is possible to clearly project a projection image. Consequently, by using the reflective screen of the aspect of the invention, it is possible to see a good image even in a kind of case of reflecting a projection light of a so-called proximity projection type projector such that the angle of projection is acute with respect to a projection surface (the reflecting surface).

Also, with the aspect of the invention, as the number of consecutive curved surface portions, among a plurality of curved surface portions aligned in at least a first direction, which are of the same curvature is limited to a maximum of three, it is possible to reduce an occurrence of a scintillation, and it is possible to clearly project the projection image.

Herein, the first direction means one certain direction such as an up-down direction (a vertical direction) or a horizontal direction (a lateral direction) on the screen installed on, for example, a wall. For example, it is sufficient that the first direction is set to the horizontal direction or the like when the projector is installed on a floor or a ceiling, and the light is projected onto the screen from obliquely downward or obliquely upward, and it is sufficient that the first direction is set to the up-down direction or the like when the projector projects the light onto the screen from a left-right direction. In sum, it is sufficient, with the positional relationship between the projector and screen, or the like, in mind, that the first direction is set to a direction in which the occurrence of the scintillation is desired to be reduced.

Also, the first direction not having to be a direction in which curved surface portions of one kind are parallel to those of another kind, for example, when the projection light of the projector or the like is projected onto the reflecting surface at an acute angle from the lower side of the center of the screen, as the scintillation is likely to occur in a radial direction when curved surface portions of the same diameter (curvature) are radially arranged in accordance with how the projection light spreads over the reflecting surface due to the acute angle, or the like, it is preferable to set at least a direction along the radial direction as the first direction.

With a screen for the proximity projection type projector, as it reflects the projection light in the front direction from the screen, concavely or convexly curved surface portions are formed thereon. With this kind of screen, normally, all of the curved surface portions have been formed in a uniform size. However, when the reflectance is increased by using an aluminum film or the like, it has happened that the scintillation occurs due to lights reflected from the curved surface portions interfering with each other.

As opposed to this, with the aspect of the invention, in a plurality of curved surface portions, among the plurality of curved portions formed on the one surface (reflecting surface) of the substrate, which are aligned in at least the first direction, the number of consecutive curved surface portions of the same curvature is limited to a maximum of three. For example, when the plurality of curved surface portions are configured of two kinds: first curved surface portions of a first curvature and second curved surface portions of a second curvature, among the curved surface portions aligned in the first direction, the first curved surface portions are disposed in series of up to three, and then, the second curved surface portions are disposed in series of up to three, so the first and second curved surface portions are disposed in series of up to three alternately.

By disposing the curved surface portions in this way, a plurality of portions, of adjacent curved portions, which differ in curvature are provided in the first direction. When curved surface portions differing in curvature are irradiated with the projection light, the optical path differences of the lights reflected by the curved surface portions can be made greater than the coherence length (interference length) of light (for example, the projection light of the projector) with which the screen is irradiated.

In this way, when the optical path differences of the reflected lights are greater than the coherence length of the projection light, the scintillation will not occur in the heretofore described portions, as a result of which it is possible to prevent a glare, and it is possible to display a high-definition image. Consequently, with the reflective screen, by limiting the number of consecutive curved surface portions of the same curvature to a maximum of three in the first direction, and increasing the portions, of adjacent curved surface portions, which differ in curvature, it is possible to reduce the occurrence of the scintillation.

With the aspect of the invention, it is preferable that curved surface portions, among a plurality of curved surface portions aligned in a second direction perpendicular to the first direction, which are of the same curvature are disposed in series of up to three.

Herein, the second direction is, for example, a direction perpendicular to the first direction. In the screen installed in a vertical direction, for example, by being installed on a wall, in the event that the first direction is the up-down direction, the second direction is a left-right direction (the horizontal direction).

Also, when the first direction is set as a radial direction from the center of the lower end of the screen, the second direction may be set as a direction of a circular arc with the lower end of the screen as its center.

By limiting the curved surface portions of the same curvature in such a way as to be disposed in series of up to three not only in the first direction, but also in the second direction, it is possible to increase the portions, of adjacent curved surface portions, which differ in curvature in comparison with when only the first direction is set, and it is possible to further reduce the occurrence of the scintillation.

With the aspect of the invention, it is preferable that the curved surface portions of the same curvature are disposed in series of up to two.

By limiting the number of consecutive curved surface portions of the same curvature to a maximum of two, it is possible to increase the portions, of adjacent curved surface portions, which differ in curvature, in comparison with when the number is limited to a maximum of three, and it is possible to further reduce the occurrence of the scintillation.

With the aspect of the invention, it is preferable that the plurality of curved surface portions are concavely curved surface portions, and that positions, in the direction of thickness of the substrate, of the outer circumferential edges of openings of the curved surface portions coincide with each other.

When the curved surface portions are formed in a concave shape, the outer circumferential edges of the openings of the curved surface portions protrude most in the direction of thickness of the substrate. Then, when the light is projected onto the screen from an oblique direction, shadowed areas occur in the protruding portions. At this time, in the event that the outer circumferential edges of the openings of the curved surface portions are not formed in a coplanar position, there is a possibility that shadows caused by portions protruding more than the outer circumferential edges of other openings spread as far as the areas of other curved surface portions.

As opposed to this, in the event that the outer circumferential edges of the openings of the curved surface portions, that is, portions protruding most from the reflecting surface, are formed in the coplanar position, shadowed areas of curved surface portions can be limited only to shadows caused by the outer circumferential edges of openings of those curved surface portions. Consequently, according to the aspect of the invention, it is possible to secure more areas reflecting the projection light, in comparison with when the positions, in the direction of thickness of the substrate, of the outer circumferential edges of the openings of the curved surface portions do not coincide with each other, and it is possible to improve the reflectance of the screen.

With the aspect of the invention, it is preferable that the plurality of curved surface portions are configured of two or three kinds of curved surface portion differing in curvature.

By providing the curved surface portions with two kinds or three kinds of curvature, it is possible to prevent the occurrence of the scintillation to an extent which has no effect on reflection characteristics.

That is, by providing the curved surface portions with two kinds of curvature, it is possible to make the optical path differences smaller than with three kinds or more, meaning that it is possible to lessen the effect on the reflection characteristics.

Also, by providing the curved surface portions with three kinds of curvature, it is possible to make the optical path differences smaller than with four kinds or more, meaning that it is possible to lessen the effect on the reflection characteristics. Also, as well as it being possible to dispose the curved surface portions using various combinations, it is possible to provide greater optical path differences by gradually changing the optical path differences, and it is possible to further prevent the occurrence of the scintillation in comparison with when the curved surface portions are provided with two kinds of curvature.

A projection system of another aspect of the invention includes the heretofore described reflective screen, and projection equipment which projects light onto a surface of the reflective screen on which the curved surface portions are formed.

A front projection television of still another aspect of the invention includes the heretofore described reflective screen, a projection unit which projects light onto a surface of the reflective screen on which the curved surface portions are formed, and a housing in which are housed the reflective screen and projection unit.

According to these kinds of projection system and front projection television, as they include the heretofore described reflective screen, it is possible to obtain the working effects achieved by the heretofore described reflective screen. Because of this, it is possible to reduce the occurrence of the scintillation, and it is possible to clearly project the projection image.

A reflective screen manufacturing method of yet another aspect of the invention, which manufactures a reflective screen which reflects a projection light, includes a first concavity forming step which forms a mask membrane, in which a plurality of first openings are provided, on the molding surface side of an original plate, and performs an isotropic etching on the molding surface of the original plate, up to a predetermined stage, through the first openings of the mask membrane, thereby forming a plurality of first concavities on the molding surface; a second concavity forming step which forms in the mask membrane a plurality of new second openings for forming second concavities, and performs an isotropic etching on the molding surface of the original plate, up to a predetermined stage, through the first openings and second openings of the mask membrane, thereby forming on the molding surface a plurality of first concavities and a plurality of second concavities differing in curvature from the first concavities; and a screen molding step which transfers the molding surface of the original plate on which are formed the first and second concavities, and molds a substrate having two kinds of convexly curved surface portion, or transfers a molding surface, on which convexities are formed, of a mold manufactured by transferring the molding surface of the original plate, and molds a substrate having two kinds of concavely curved surface portion, and forms a reflective film on the curved surface portions of the substrate.

With the reflective screen manufacturing method of the aspect of the invention, the screen substrate is molded and manufactured by transferring the molding surface of the original plate on which are formed the plurality of first concavities and the plurality of second concavities, or by transferring the molding surface, on which the convexities are formed, of the mold manufactured by transferring the molding surface of the original plate.

When the substrate is molded by transferring the molding surface of the original plate on which the plurality of concavities are formed, a plurality of convexly curved surface portions of each of two kinds corresponding to the concavities are formed on the substrate. In contrast, when the mold of the substrate is manufactured by transferring the molding surface of the original plate, and the substrate is molded by transferring the manufactured mold, a plurality of concavely curved surface portions of each of two kinds corresponding to the convexities of the mold, that is, a plurality of concavely curved surface portions the same as the concavities of the original plate, are formed on the substrate.

Then, the reflective film is formed on the two kinds of curved surface portion of the substrate. Consequently, by appropriately designing the curved surface portions and reflective film, it is possible to manufacture a reflective screen wherein it is possible to efficiently reflect the reflected lights in the front direction from the screen, and it is possible to clearly project the projection image.

Also, as an isotropic etching is performed on the original plate through the first and second openings of the mask membrane, approximately hemispherical concavities are formed on the original plate. Also, as the plurality of new second concavities differing in curvature from the plurality of first concavities formed first on the molding surface of the original plate are formed thereon, it is also possible to cause the reflective screen manufactured in the heretofore described way to include a configuration wherein adjacent curved surface portions differ in curvature. Because of this, it is possible to manufacture a reflective screen wherein it is possible to change the optical path differences of the reflected lights from the curved surface portions, and it is possible to prevent the occurrence of the scintillation, and display the high-definition image.

Also, as the plurality of new second openings for another etching differing from the previous etching are formed in the mask membrane, and an isotropic etching is performed through all of the openings of the mask membrane, it is possible to easily form concavities differing in curvature simply by adding openings and etching them again.

A reflective screen manufacturing method of still yet another aspect of the invention, which manufactures a reflective screen which reflects a projection light, includes a first concavity forming step which forms a mask membrane, in which a plurality of first openings are provided, on the molding surface side of an original plate, and performs an isotropic etching on the molding surface of the original plate, up to a predetermined stage, through the first openings of the mask membrane, thereby forming a plurality of first concavities on the molding surface; a second concavity forming step which forms in the mask membrane a plurality of new second openings for forming second concavities, and performs an isotropic etching on the molding surface of the original plate, up to a predetermined stage, through the first openings and second openings of the mask membrane, thereby forming on the molding surface a plurality of first concavities and a plurality of second concavities differing in curvature from the first concavities; a third concavity forming step which forms in the mask membrane a plurality of new third openings for forming third concavities, and performs an isotropic etching on the molding surface of the original plate, up to a predetermined stage, through the first, second, and third openings of the mask membrane, thereby forming on the molding surface a plurality of third concavities differing in curvature from the first and second concavities; and a screen molding step which transfers the molding surface of the original plate on which are formed the first, second, and third concavities, and molds a substrate having three kinds of convexly curved surface portion, or transfers a molding surface, on which convexities are formed, of a mold manufactured by transferring the molding surface of the original plate, and molds a substrate having three kinds of concavely curved surface portion, and forms a reflective film on the curved surface portions of the substrate.

With the reflective screen manufacturing method of the aspect of the invention, the same working effects as those of the heretofore described reflective screen manufacturing method are performed. Furthermore, by forming the plurality of new third openings in the mask membrane after the second concavity forming step and before the screen molding step, and performing an isotropic etching on the molding surface of the original plate, up to the predetermined stage, through all of the openings of the mask membrane, it is possible to form on the molding surface the first, second, and third concavities differing in curvature from one another. Because of this, it is possible to form on the manufactured substrate the concavely or convexly curved surface portions with the curved surfaces of three kinds of curvature. By this means, it is possible to dispose the curved surface portions using various combinations, and it is possible to provide the greater optical path differences by gradually changing the optical path differences.

According to the aspects of the invention, it is possible to prevent the occurrence of the scintillation, and display the high-definition image.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
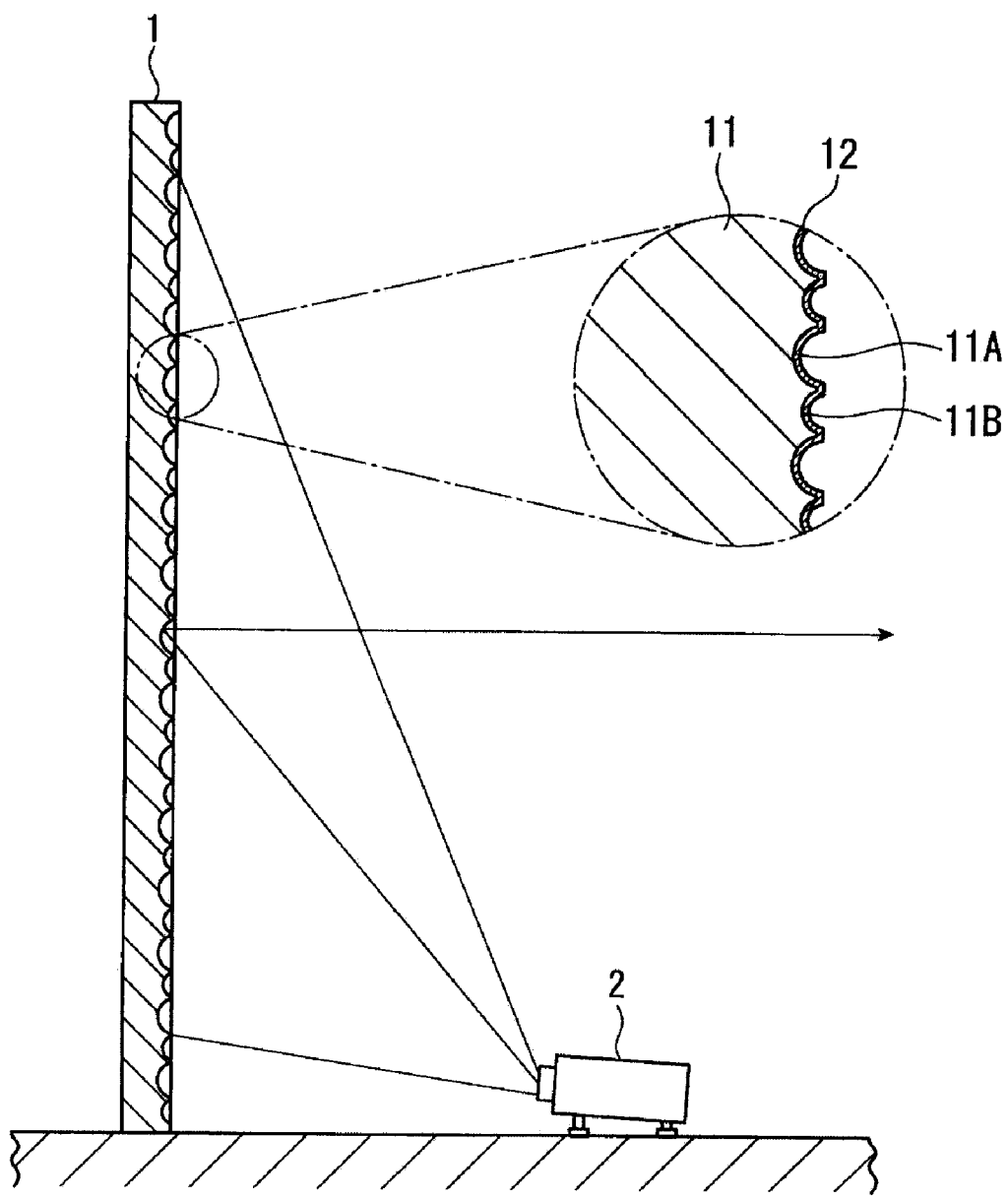
FIG. 1 is a diagram showing an image projection system including a screen according to a first embodiment of the invention.

Hereafter, a description will be given, based on the drawings, of a first embodiment of the invention.

In and after a second embodiment, to be described hereafter, the same parts as component parts in the first embodiment, to be described hereafter, and parts having functions similar to those therein, being given identical numerals and characters, a description will be simplified or omitted. In the drawings below, in order to make layers and members recognizable in size in the drawings, the scale of each of the layers and members is changed as appropriate.

1-1. Screen

FIG. 1 is one example of an image projection system including a screen according to the first embodiment of the invention. The image projection system is configured including a screen 1 and a projector (projection equipment) 2. The screen 1 is a reflective screen which reflects a projection image from the projector 2, making an image visible to a viewer. The projector 2 is a proximity projection type projector which requires a short distance from the screen 1 (for example, a projection distance of around 60 cm).

A projection light emitted from the projector 2 is reflected by the screen 1, thereby enabling the viewer in front of the screen 1 to see the image on the screen 1. The screen 1 has an optical function for efficiently reflecting the projection light from the projector 2 toward the viewer side, and projecting it onto the screen 1 so as to be clearly visible. Specifically, the screen 1 is of a configuration wherein it is provided with a field of view of a predetermined angle (a configuration wherein it has a good contrast at a predetermined angle) by means of concavities (concavely curved surface portions) and a reflective film, to be described hereafter. Hereafter, a detailed description will be given of the screen of the embodiment.

As shown in FIG. 1, the screen 1 has a configuration including a substrate 11 and a reflective film 12 formed on the substrate 11. In the screen 1, a surface on which the reflective film 12 is formed is a reflecting surface onto which the image is projected.

The material of the substrate 11, it being sufficient that it is one normally used for a substrate of the screen 1, is not particularly limited. The material specifically includes an ultraviolet curable resin, silicone rubber, and the like.

The material of the reflective film 12, although not particularly limited, provided that it has a high reflectance, includes a metal such as, for example, aluminum (Al) or silver (Ag). By using a material having a high reflectance, it is possible to project a bright image even in the event of using a proximity type projector which causes the projection light to fall incident on the projection surface of the screen 1 at an acute angle. Although not shown, another thin film, such as a protective film, may be formed on the reflective film 12 when needed.

It is sufficient that the thickness of the substrate 11 and reflective film 12 is made an appropriate thickness in accordance with the material of each portion and the type of screen 1.

Concavities 11A and 11B forming a multitude of curved surface portions are disposed on the reflecting surface side of the substrate 11. Each of the concavities 11A and 11B has an approximately hemispherical concave surface.

The concavities 11A and 11B, and reflective film 12, are appropriately designed in such a way as to reflect the projection light of the projector 2 in a front direction from the screen 1, and cause the projection image to be clearly projected onto the screen 1. This design is not particularly limited, provided that it has the concavities 11A and 11B, and reflective film 12. The screen 1 realizes one portion of the heretofore described optical function, that is, the configuration wherein it has the good contrast at the predetermined angle, by means of a structure of this design.

Herein, a detailed description will be given of the shape of the concavities 11A and 11B. The diameter of the concavities 11A and 11B is appropriately set based on the resolution of the screen 1, the viewpoint of productivity, and the like. Heretofore, all of the concavities have been made the same in size when a reflective screen is configured by forming the reflective film 12 on the substrate 11 on which these kinds of concavity are formed.

However, when all of these concavities are made the same in size, their hemispherical surfaces also become the same in curvature, meaning that, when the reflective film 12 is formed on the concavities using a high reflectance material, such as aluminum, a distinctive glare called a scintillation occurs due to the interference of lights reflected from the concavities.

The inventors of the present application have found that the scintillation does not occur when the optical path differences of the reflected lights from the concavities are greater than the coherence length of light with which the screen 1 is irradiated, with the result that the concavities are formed in the following way.

In the embodiment, the concavities (curved surface portions) being configured of two kinds, the concavities 11A and the concavities 11B, the concavities 11A are larger in hemisphere diameter than the concavities 11B, and different in curvature from the concavities 11B.

Specifically, in order to solve the scintillation, the surface curvatures of the concavities 11A and 11B are set in such a way that, in portions in which concavities are adjacent, the optical path differences of the reflected lights are greater than the coherence length of the projection light of the projector 2 which is projected onto the screen 1. That is, the curvatures of the concavities 11A and 11B are set in such a way that the optical path differences of lights reflected when adjacent concavities 11A and 11B are irradiated with the projection light from the projector 2 are greater than the coherence length of the projection light.

In this way, by making the concavities 11A different in surface curvature from the concavities 11B, it is possible, in portions in which concavities 11A and 11B are adjacent, to change the optical path differences of the reflected lights in the concavities, and it is possible to prevent the occurrence of the scintillation.

Although depending on the type of projection light of the projector 2 too, when the projection light of the projector 2 is of, for example, a lamp source such as an ultra high pressure mercury-vapor lamp, a xenon lamp, or a halogen lamp, by taking the optical path differences to be 5 µm or more, it is possible to make the optical path differences greater than the coherence length.

Also, it is preferable to determine the sizes of the concavities 11A and 11B in such a way as to have optical path differences of such an extent that the setting (for example, a predetermined setting for realizing the heretofore described optical function) of the screen 1 does not change as a whole even though the concavity hemisphere diameter is made different between the concavities 11A and 11B.

It is possible to configure in such a way that the previous setting does not change, for example, by adopting a configuration wherein the diameter of the concavities 11A is taken to be 370 μm, and the diameter of the concavities 11B is 350 μm to 355 μm, smaller by 15 μm to 20 μm than that of the concavities 11A. In order to prevent image degradation, it is preferable that the diameter of the concavities 11A of the large size is made smaller in size than the pixels of the projector 2.

Next, a detailed description will be given of a disposition pattern of the concavities 11A and 11B. The pattern of the concavities 11A and 11B is not particularly limited, provided that it is one in which a plurality of concavities 11A and 11B are disposed adjacent. Specifically, the disposition pattern includes a square lattice pattern, a hound's-tooth pattern, and the like. However, a configuration is such that the concavities 11A and 11B are disposed alternately.

Figure 2A:
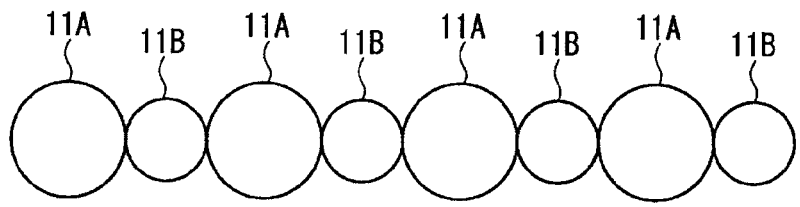
FIGS. 2A to 2C are top views showing disposition patterns of concavities in the first embodiment.

FIG. 2A is a top view showing a pattern of an alignment of concavities 11A and 11B in a first direction. The diagram shows only one portion of the alignment in the first direction so as to facilitate understanding, but consistently expresses the alignment in the first direction. As the reflecting surface of the screen 1 is a rectangular flat surface, actually, the concavities 11A and 11B are also two-dimensionally disposed, and the concavities 11A and 11B are disposed aligned in a vertical direction and oblique direction too, as shown in FIGS. 2B and 2C.

Also, the first direction in the embodiment is an up-down direction (the vertical direction) in the screen 1 shown in FIG. 1.

As shown in FIG. 2A, by disposing the concavities 11A and concavities 11B alternately in at least the first direction, the interference of the reflected lights occurs between alternate concavities 11A across concavities 11B, and between alternate concavities 11B across concavities 11A but, as no concavities 11A are adjacent, nor are concavities 11B, there is no interference of the lights reflected by adjacent concavities 11A and 11B. Consequently, it is possible to dramatically reduce the scintillation as a whole too.

Figure 2B:
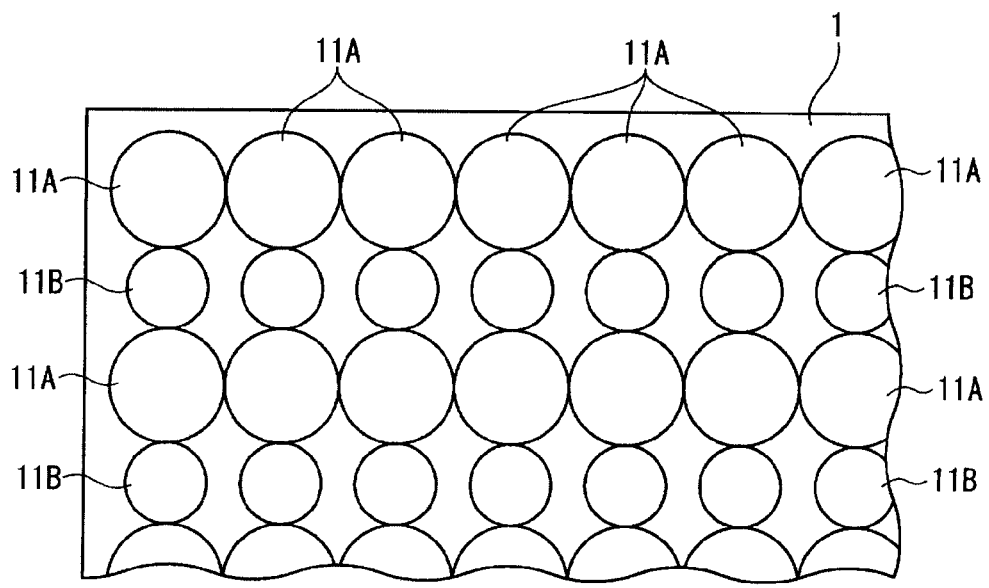
Figure 2C:
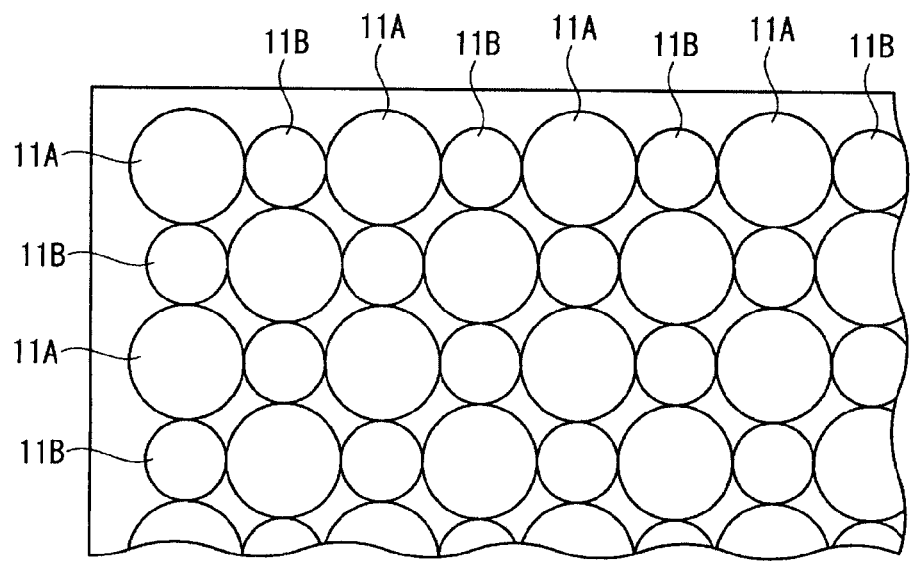

FIG. 2B is an example in which, in the screen 1, the concavities 11A and concavities 11B are disposed alternately in the first direction which is the up-down direction, and series of concavities 11A of one kind or series of concavities 11B of one kind are disposed in a second direction (a left-right direction) perpendicular to the first direction.

In the case of FIG. 2B, it is possible to eliminate the interference of the reflected lights between the concavities 11A and 11B aligned in the up-down direction, as heretofore described, and it is possible to reduce the scintillation.

Also, FIG. 2C is an example in which, in the screen 1, the concavities 11A and concavities 11B are disposed alternately in each of the first direction which is the up-down direction and the second direction (left-right direction) perpendicular to the first direction.

In the case of FIG. 2C, it is possible to eliminate the interference of the reflected lights between the concavities 11A and 11B aligned in the up-down direction and left-right direction, and it is possible to reduce the scintillation not only in the first direction, but also in the second direction.

In FIG. 2C, there is an advantageous effect in the first and second directions, while concavities 11A of the same curvature are aligned in a diagonal direction, and so are concavities 11B of the same curvature, meaning that a scintillation reduction effect in the first direction decreases in comparison with the alignment of FIG. 2B. Consequently, particularly when desiring to increase the scintillation reduction effect in the first direction, it is sufficient to employ the alignment of FIG. 2B. In contrast, when the scintillation reduction effect is required in both of the first and second directions, it is sufficient to employ the alignment of FIG. 2C.

1-2. Screen Manufacturing Method

Next, a description will be given of a screen manufacturing method according to the embodiment. The screen 1 is manufactured using a screen mold (hereafter abbreviated as a mold as appropriate). The mold is, furthermore, manufactured using an original plate. The screen mold is manufactured by a mold manufacturing process, and the original plate is molded by an original plate molding process. Hereafter, a description will be given in order from the original plate molding process which is carried out first.

1-2-1. Original Plate Molding Method

FIGS. 3A to 3F are fragmentary sectional views for illustrating the original plate molding process.

In the original plate molding process, firstly, a mask membrane forming process is carried out.

Figure 3A:
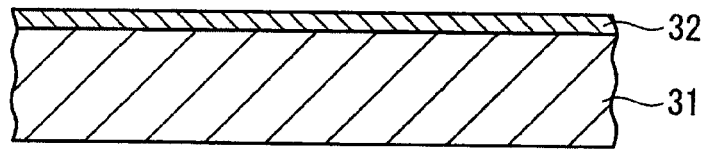
FIGS. 3A to 3F are fragmentary sectional views for illustrating an original plate molding process.

In the mask membrane forming process, as shown in FIG. 3A, a mask membrane 32 is formed on one surface (a smooth surface) of a pre-molded original plate 31 prepared in advance.

The material of the original plate 31 not being particularly limited, it is possible to use a material normally used for an original plate of a mold. However, as the material of the original plate 31, one in which deflection is unlikely to occur, and which is difficult to damage, is preferable. Also, one which is easy to process in the subsequent processes (an etching process and the like), and inexpensive, is preferable. Specifically, the material includes any kind of glass, any kind of metal, any kind of resin typified by plastic, and the like. It is possible to use, for example, blue plate glass as the material of the original plate 31 from the viewpoints of strength, workability, manufacturing costs, and the like.

The material of the mask membrane 32 not being particularly limited either, it is possible to select an appropriate one in accordance with the subsequent processes (an initial hole forming process, an etching process, and the like). It is preferable that the mask membrane 32 is, for example, a laminated body having a layer configured mainly of chromium and a layer configured mainly of chromium oxide. More specifically, it is preferable that a chromium oxide membrane, a chromium membrane, and a chromium oxide membrane are formed in this order on the original plate 31 into a three-layer structure, and that their thicknesses are taken to be 10 nm, 30 nm, and 30 nm respectively. With the mask membrane 32 of this kind of structure, it is possible to easily and reliably form openings of a desired shape by means of the kind of laser treatment to be described hereafter, or the like. Also, with the mask membrane 32 of this kind of structure, it is possible to secure an excellent stability against etchants of various compositions, and it is possible to accurately carry out a formation of the concavities 11A and 11B by an etching, to be described hereafter.

Also, the mask membrane 32 forming method not being particularly limited either, it is sufficient to appropriately select one in accordance with the materials, or the like, of the mask membrane 32 and original plate 31. It is possible to suitably form the mask membrane 32 by means of, for example, a deposition method or sputtering method. Also, when the mask membrane 32 is configured of silicon, it is possible to suitably form it by means of the sputtering method or the like.

The initial hole forming process is carried out, followed by the mask membrane forming process.

Figure 3B:
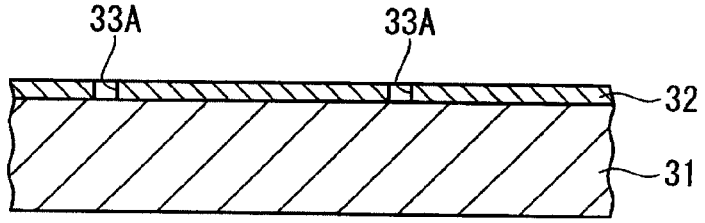

In the initial hole forming process, as shown in FIG. 3B, a multitude of openings (first openings) 33A are formed in the mask membrane 32 formed on the original plate 31.

The method of forming the openings 33A, although not particularly limited, is preferably, for example, a method using an irradiation with YAG triple harmonic laser light. By this means, it is possible to easily and accurately form the multitude of openings 33A of a desired shape in the mask membrane 32 in an alignment of a desired pattern.

Although the shape and size of the openings 33A are not particularly limited, provided that the subsequent processes (an etching process and the like) are possible, in the embodiment, the openings 33A are formed in such a way that all of them are of the same shape and size. It is possible to form, for example, through holes with a diameter of 4 μm as the openings 33A.

Also, although the disposition pattern of the openings 33A in the mask membrane 32 is not particularly limited, the heretofore described pattern of the concavities 11A is determined based on the disposition pattern of the openings 33A. That is, in the embodiment, as the substrate 11 of the screen 1 is formed by transferring the mold manufactured by transferring the original plate 31, the openings 33A have a disposition pattern in common with the heretofore described concavities 11A.

A first etching process is carried out, followed by the initial hole forming process.

Figure 3C:
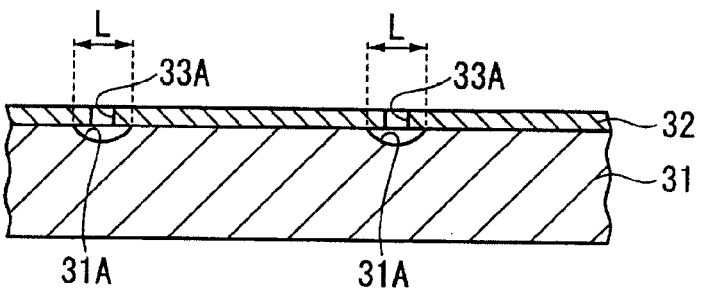

In the first etching process, as shown in FIG. 3C, the one surface side of the original plate 31 is wet etched up to a predetermined stage. Although an etchant is not particularly limited, provided that it is one normally used in etching the original plate 31, for example, when the original plate 31 is blue plate glass, and the mask membrane 32 is the previously mentioned multilayer chromium membrane, it is possible to use buffered hydrofluoric acid.

The original plate 31 is etched by the etchant coming in from the openings 33A, and a multitude of first concavities 31A are formed in accordance with the disposition pattern of the openings 33A. This etching being an isotropic etching, the concavities 31A are formed in an approximately hemispherical shape. Also, as all of the openings 33A are formed in a uniform shape and size, the concavities 31A are formed so that all of their hemisphere diameters are also equal. Consequently, the concavities 31A are formed so that all of their surface curvatures are equal. For example, in the first etching, as the predetermined stage, the original plate 31 is etched until a hemisphere diameter L of the concavities 31A reaches 15 μm to 20 μm, and the depth thereof reaches 7.5 to 10 μm. In the embodiment, in the screen manufacturing method, a processing up to this condition is called a first concavity forming step.

In the embodiment, an additional hole forming process and a second etching process are sequentially carried out after the first etching process.

Figure 3D:
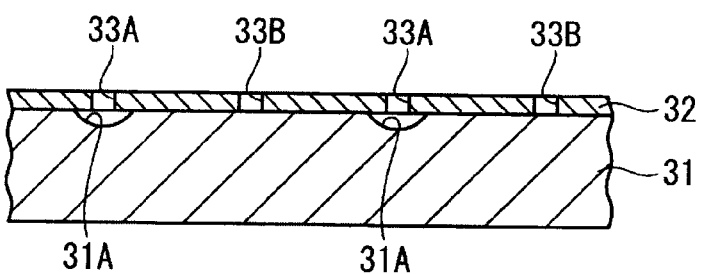

In the additional hole forming process, as shown in FIG. 3D, a multitude of openings (second openings) 33B are formed in the mask membrane 32 on the original plate 31 while avoiding the openings 33A.

The openings 33B are formed in the same way as the openings 33A. That is, after forming the openings 33B, the multitude of openings 33A and openings 33B are formed in the mask membrane 32 in such a way that all of them are of a uniform shape and size.

In the same way as the openings 33A, the disposition pattern of the openings 33B in the mask membrane 32 is not particularly limited, but the pattern of the concavities 11B is determined based on the disposition pattern of the openings 33B. That is, in the embodiment, the openings 33B have a disposition pattern in common with the heretofore described concavities 11B. That is, as the combined openings 33A and 33B have a disposition pattern in common with the heretofore described concavities 11A and 11B, in order that the concavities 11A and concavities 11B are disposed alternately, the openings 33A and 33B are formed in such a way as to be disposed in positions designed alternately in at least the first direction of the screen 1.

Figure 3E:
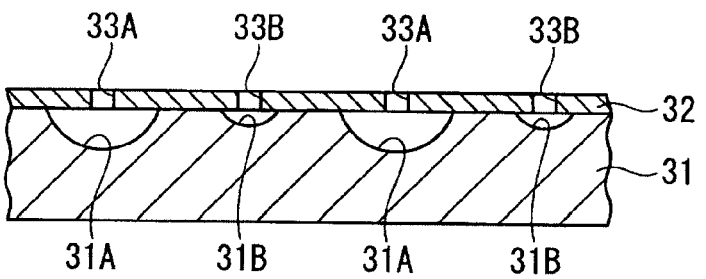

In the second etching process, as shown in FIG. 3E, the one surface side of the original plate 31 is wet etched again up to a predetermined stage. The original plate 31 is etched by an etchant coming in from the openings 33A and openings 33B. By this means, a multitude of second concavities 31B are newly formed in accordance with the disposition pattern of the openings 33B. This etching also being an isotropic etching, the concavities 31B are formed in an approximately hemispherical shape. Also, as all of the openings 33B are formed in a uniform shape and size, the concavities 31B are formed so that all of their hemisphere diameters are also equal. Consequently, the concavities 31B are formed so that all of their surface curvatures are equal.

Also, the etching of the first concavities 31A having progressed further than earlier, the hemisphere diameter becomes larger, and the depth becomes greater. That is, the first concavities 31A are formed to be larger than the second concavities 31B by the amount of the first etching. As the hemisphere diameter of the concavities 31A is larger than the hemisphere diameter of the concavities 31B, the surface curvature differs between the concavities 31A and concavities 31B.

Figure 3F:
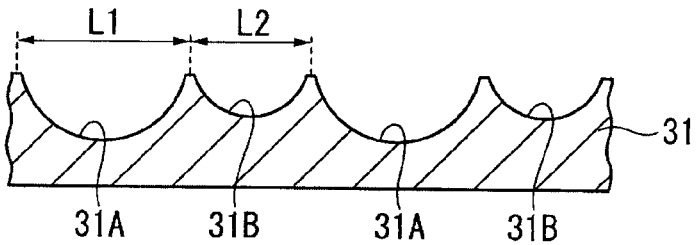

An etching is performed by the second etching process up to a predetermined stage in which concavities 31A and concavities 31B are adjacent. For example, in this second etching, as shown in FIG. 3F, as the predetermined stage, an etching is performed until a hemisphere diameter L1 of the concavities 31A reaches 370 μm, and a hemisphere diameter L2 of the concavities 31B reaches 350 μm to 355 μm. By this means, the diameters of the concavities 11A and 11B of the substrate 11 of the screen 1 to be manufactured afterward also reach 370 μm and 350 μm to 355 μm respectively. In the embodiment, with strength and the like in mind, a tiny smooth portion is provided between the concavities in a range which has no effect on optical characteristics due to the concavities 11A and 11B, and reflective film 12 of the screen 1 to be manufactured afterward. In the screen manufacturing method, a processing up to this condition is called a second concavity forming step.

A mask membrane removing process is carried out, followed by the second etching process.

In the mask membrane removing process, as shown in FIG. 3F, all of the mask membrane 32 on the original plate 31 is removed, and the original plate 31 is washed and dried. Methods of removing the mask membrane 32, and washing and drying the original plate 31, not being particularly limited, it is sufficient to appropriately select ones in accordance with the materials of the original plate 31 and mask membrane 32.

By the heretofore described means, the original plate 31 on the one surface of which are formed the hemispherical concavities 31A and concavities 31B differing in curvature is molded.

1-2-2. Screen Mold Manufacturing Method

Next, a description will be given of the mold manufacturing process.

Figure 4A:
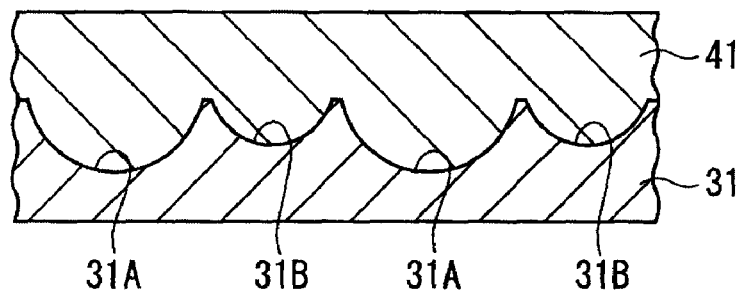
FIGS. 4A and 4B are fragmentary sectional views for illustrating a mold manufacturing process.
Figure 4B:
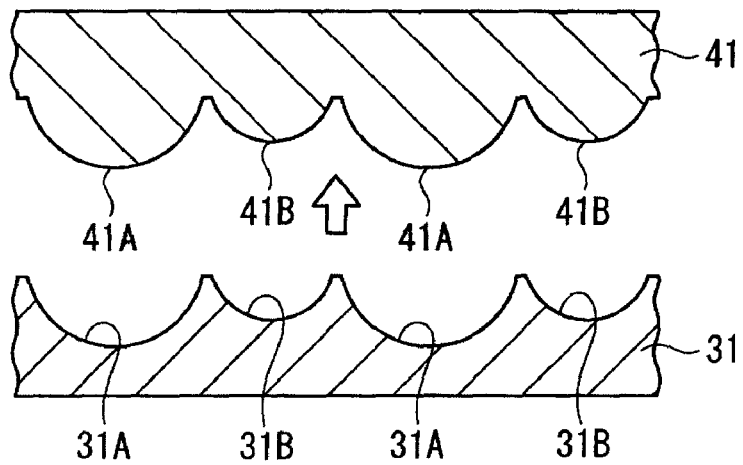

FIGS. 4A and 4B are fragmentary sectional views for illustrating the mold manufacturing process.

In the mold manufacturing process, firstly, an original plate transferring process is carried out.

In the original plate transferring process, as shown in FIG. 4A, the one surface (surface on which the concavities 31A and concavities 31B have been formed) of the original plate 31 molded by the original plate molding process is transferred, molding a mold 41.

The material of the mold 41 not being particularly limited, it is possible to use a material normally used for a mold. However, as the material of the mold 41, one in which deflection is unlikely to occur, and which is difficult to damage is preferable. Also, one which is easy to process in the subsequent processes, and inexpensive, is preferable. Specifically, the material includes any kind of glass, any kind of metal, any kind of resin typified by plastic, and the like.

Also, as the material of the mold 41, it is preferable to select one which is easy to release from the original plate 31. Even when a material with a good adhesiveness is selected, it is sufficient to subject the transfer surface of the original plate 31 in advance to a release process such as applying thereto a release agent.

It is also sufficient to appropriately set the thickness of the mold, provided that the thickness is of a size sufficient to be used for a mold.

A method of transferring the transfer surface of the original plate 31 not being particularly limited either, it is sufficient to appropriately select one depending on the materials, or the like, of the original plate 31 and mold 41. For example, when using blue plate glass as the original plate 31, it is possible to mold the mold 41 by means of an electroforming using a conductive material such as nickel.

A mold release process is carried out, followed by the original plate transferring process.

In the mold release process, as shown in FIG. 4B, the mold 41 molded by the original plate transferring process is released from the original plate 31.

By the heretofore described means, the mold 41 on one surface of which are formed hemispherical convexities 41A and convexities 41B differing in curvature is manufactured.

1-2-3. Screen Molding Method

Next, a description will be given of a screen molding process.

Figure 5A:
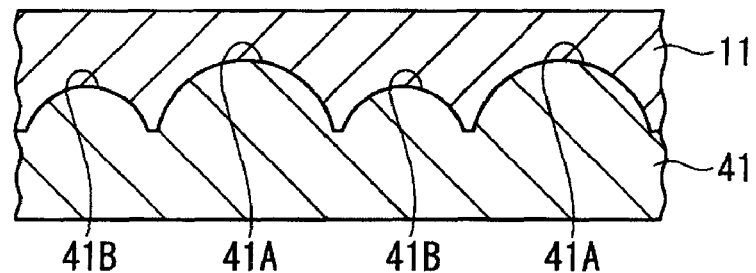
FIGS. 5A to 5C are fragmentary sectional views for illustrating a screen molding process.
Figure 5B:
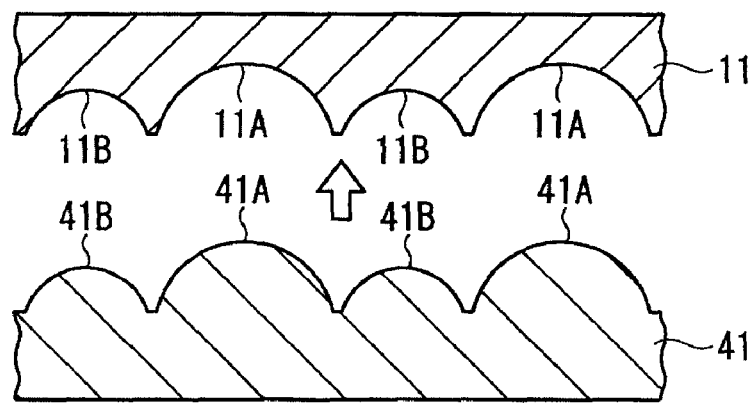
Figure 5C:
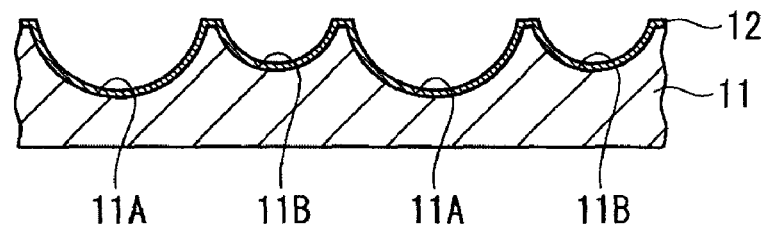

FIGS. 5A to 5C are fragmentary sectional views for illustrating the screen molding process.

In the screen molding process, firstly, a mold transferring process is carried out.

In the mold transferring process, as shown in FIG. 5A, the one surface (surface on which the convexities 41A and convexities 41B are formed) of the mold 41 manufactured by the mold manufacturing process is transferred, molding the substrate 11.

The materials of the substrate 11 have been described in "1-1. Screen", but it is preferable to select one which is easy to release from the mold 41. Even when a material which easily adheres is selected, it is sufficient to subject the transfer surface of the mold 41 in advance to a release process such as applying thereto a release agent.

A method of transferring the molding surface of the mold 41 not being particularly limited either, it is sufficient to appropriately select one depending on the materials, or the like, of the mold 41 and substrate 11. For example, when using an ultraviolet curable resin for the substrate 11, it is possible to mold the substrate 11 by applying a material to, and spreading it over, the mold 41 by means of a spin coating method, and curing the applied and spread material by irradiating it with ultraviolet rays.

A substrate release process is carried out, followed by the mold transferring process.

In the substrate release process, as shown in FIG. 5B, the substrate 11 molded by the mold transferring process is released from the mold 41.

By this means, the substrate 11 on one surface of which are formed the hemispherical concavities 11A and concavities 11B differing in curvature is manufactured. Consequently, the concavely curved surface portions are configured of these concavities 11A and 11B.

A reflective film forming process is carried out, followed by the substrate release process.

In the reflective film forming process, as shown in FIG. 5C, the reflective film 12 is formed on the surface of the substrate 11 on which the concavities 11A and 11B are formed.

As the material of the reflective film 12 has been described in "1-1. Screen", a description is omitted here.

A method of forming the reflective film 12 not being particularly limited, it is sufficient to appropriately select one depending on the materials, or the like, of the substrate 11 and reflective film 12. When using, for example, aluminum as the material of the reflective film 12, it is possible to form the reflective film 12 by means of a deposition method.

Finally, a thin film (not shown) such as a protective film is formed on the reflective film 12 when needed.

By the heretofore described means, the hemispherical concavities 11A and concavities 11B differing in curvature are formed on the one surface (reflecting surface) of the substrate 11. Then, the reflective film 12 is formed on the concavities 11A and 11B of the substrate 11, thereby manufacturing the screen 1. In the screen manufacturing method, a processing up to the condition of FIG. 5C is called a screen molding step.

As the screen 1 is manufactured according to the procedure of FIGS. 3A to 5C, positions, in the direction of thickness of the substrate, of the outer circumferential edges of the openings of the plurality of concavities 11A and 11B coincide with each other. That is, as shown in FIG. 5C, the outer circumferential edges of the openings of the concavities 11A and 11B are most protruded portions in the substrate 11, and the positions are disposed in the same plane and flush with each other.

1-3. Working Effects of First Embodiment

According to the screen of the first embodiment, as it has the plurality of hemispherical concavities 11A and 11B disposed on the reflecting surface of the substrate 11, and the reflective film 12 formed on the concavities 11A and 11B, it is possible to efficiently reflect the reflected lights in the front direction from the screen 1, and it is possible to clearly project the projection image. In particular, as the concavely curved surface portions are formed, on the screen 1, of the concavities 11A and 11B, it is possible to efficiently reflect the projection light of the proximity projection type projector 2, and it is possible to see a good image.

Also, as the screen 1 includes a configuration wherein concavities 11A and concavities 11B are made adjacent, and the adjacent concavities are made different in surface curvature, it is possible to change the optical path differences of the reflected lights from the concavities 11A and 11B. As the shape ratio between the concavities 11A and 11B is set in such a way that the optical path differences of the reflected lights from the concavities 11A and 11B are greater than the coherence length of the projection light of the projector 2 with which the screen 1 is irradiated, it is possible to prevent the occurrence of the scintillation, and display a high-definition image.

Furthermore, as the concavities are shaped in two kinds, the concavities 11A and concavities 11B, it is possible to prevent the occurrence of the scintillation to an extent at which it has no effect on the original optical characteristics attributed to the concavities and reflective film. As there are two kinds of concavity 11A and 11B, in the event that the optical path differences between the two kinds of concavity are made the same, it is possible to make the optical path differences smaller than when three kinds or more are provided, meaning that it is possible to configure in such a way as to have a smaller effect on the optical characteristics.

Furthermore, in the embodiment, on the reflecting surface of the screen 1, the concavities 11A and 11B are disposed alternately in such a way that no concavities of the same curvature are consecutive in at least the first direction. Because of this, it is possible, in at least the first direction, to eliminate the interference of the reflected lights between the concavities 11A and 11B, and it is possible to suppress the occurrence of the scintillation.

Also, in the event that the concavities 11A and 11B are disposed alternately not only in the first direction, but also in the second direction, as shown in FIG. 2C, the concavities 11A and 11B differ in curvature from concavities adjacent thereto in four up, down, left, and right directions, meaning that it is possible to suppress the occurrence of the scintillation in two directions.

With the screen manufacturing method of the first embodiment, as the mold 41 of the substrate 11 is manufactured by transferring the molding surface of the original plate 31 on which are formed the plurality of concavities 31A and 31B having curvatures differing one from the other, and the substrate 11 is molded by transferring the manufactured mold 41, it is possible to form on the substrate 11 the same shapes as those of the plurality of concavities 11A and 11B corresponding to the convexities 41A and 41B of the mold 41, that is, as those of the concavities 31A and 31B of the original plate 31. Consequently, it being sufficient, when the concavities 31A and 31B are formed on the original plate 31 by an etching, to form the concavities 31A and 31B the same as the designed concavities 11A and 11B of the substrate 11 by controlling the disposition positions of the openings 33A and 33B, an etching time, and the like, it is possible, by examining the original plate 31, to easily examine whether the screen can be manufactured as designed.

Also, as the reflective film 12 is formed on the concavities 11A and 11B of the substrate 11, by properly designing the concavities 11A and 11B, and reflective film 12, it is possible to efficiently reflect the reflected lights in the front direction, and it is possible to manufacture a screen 1 onto which the projection image can be clearly projected.

Furthermore, as the plurality of new concavities 31B differing in curvature from the plurality of concavities 31A formed first on the molding surface of the original plate 31 are formed thereon, it is also possible to cause the screen 1 to be manufactured to include a configuration wherein the adjacent concavities 11A and 11B are made different in surface curvature. Because of this, it is possible to manufacture a screen 1 wherein it is possible to change the optical path differences of the reflected lights from the concavities 11A and 11B, and it is possible to prevent the occurrence of the scintillation, and display the high-definition image.

Also, as the plurality of new openings 33B differing from the openings 33A used in the first etching are formed in the mask membrane 32, and subjected to the isotropic etching through all of the openings (openings 33A and 33B) of the mask membrane 32, it is possible, by adding the openings 33B and etching them again, to easily form the concavities differing in curvature on the substrate 11 configuring the screen 1.

Furthermore, as the outer circumferential edges of the openings of the concavities 11A and 11B, that is, the portions protruding most from the reflecting surface, are formed in the coplanar positions, it is possible to limit areas shadowed in the concavities 11A and 11B to only areas shadowed by the outer circumferential edges of the openings of the concavities 11A and 11B. Consequently, it is possible to secure more areas which reflect the projection light, and improve the reflectance of the screen, in comparison with when the positions, in the direction of thickness of the substrate 11, of the outer circumferential edges of the openings of the concavities 11A and 11B do not coincide with each other.

2. Second Embodiment

Hereafter, a description will be given of a second embodiment of the invention.

In the second embodiment, only the shape of the concavities differs from the first embodiment, and everything else is the same. Consequently, a description will hereafter be given mainly of differences from the first embodiment.

2-1. Screen

In the first embodiment, the curved surface portions formed on the substrate 11 are configured of two kinds, the concavities 11A and concavities 11B, but with a reflective screen 101 of the second embodiment, a difference is that they are configured of three kinds. The material and the like are the same as those in the first embodiment, and a description is omitted here.

Figure 6A:
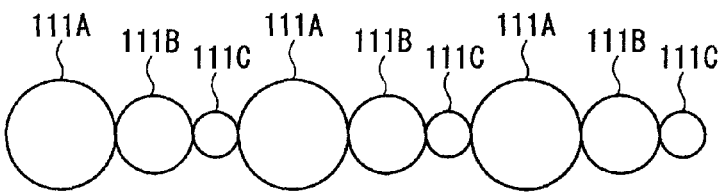
FIGS. 6A to 6C are top views showing shapes and disposition patterns of concavities in a second embodiment.
Figure 6B:
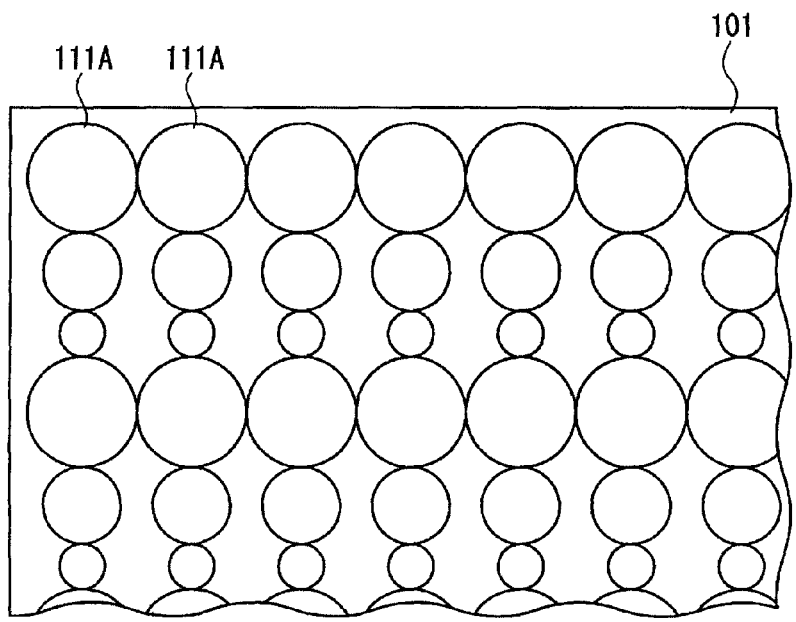
Figure 6C:
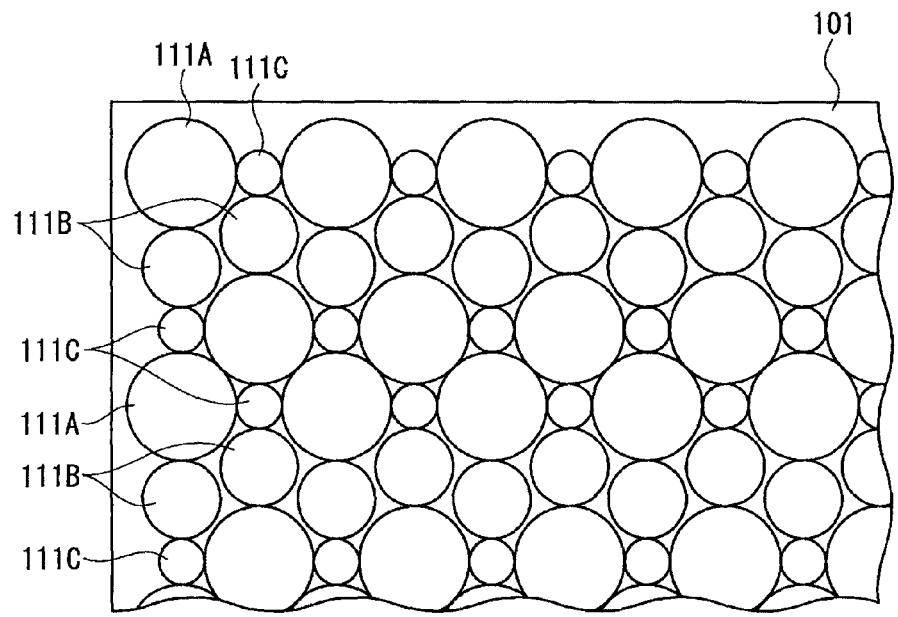

FIGS. 6A to 6C are top views showing shapes and disposition patterns of the concavities in the second embodiment. In FIG. 6A too, only one portion in the first direction is shown in order to facilitate understanding, but consistently expresses an alignment in the first direction. As the reflecting surface of the screen 101 is a rectangular flat surface, actually, as shown in FIGS. 6B and 6C, concavities 111A, 111B, and 111C are also two-dimensionally disposed, and the concavities 111A, 111B, 111C are disposed aligned in the vertical direction and oblique direction too.

As shown in FIGS. 6A to 6C, the concavities (curved surface portions) formed on the screen 101 in the embodiment are configured of three kinds of concavity 111A, 111B, and 111C. A configuration is such that the concavities 111A are larger in hemisphere diameter than the concavities 111B, and the concavities 111B are larger in hemisphere diameter than the concavities 111C.

Because of this, the concavities 111A, 111B, and 111C differ in surface curvature from one another.

Specifically, in the same way as in the first embodiment, in order to solve the scintillation, in portions in which concavities 111A, 111B, and 111C are adjacent, the surface curvatures of the concavities 111A, 111B, and 111C are set in such a way that the optical path differences of the reflected lights are greater than the coherence length of the projection light of the projector 2 projected onto the screen.

In this way, by making the surface curvatures of the concavities 111A, 111B, and 111C different from one another, it is possible, in portions in which concavities 111A, 111B, and 111C are adjacent to each other, to change the optical path differences of the reflected lights in comparison with portions in which concavities 111A are adjacent, portions in which concavities 111B are adjacent, or portions in which concavities 111C are adjacent, and it is possible to prevent the occurrence of the scintillation.

As described in the first embodiment, although depending on the type of light source too, when the projection light of the projector 2 is, for example, of a lamp source such as an ultra high pressure mercury-vapor lamp, a xenon lamp, or a halogen lamp, by taking the optical path differences between the concavities to be 5 μm or more, it is possible to make the optical path differences greater than the coherence length.

Also, it is preferable to determine the sizes of the concavities 111A, 111B, and 111C in such a way as to provide optical path differences of such an extent that the setting (for example, a predetermined setting for realizing the heretofore described optical function) of the screen does not change as a whole.

It is possible to configure in such a way that the previous setting does not change, for example, by adopting a configuration wherein, the diameter of the concavities 111A being taken to be 370 μm, the diameter of the concavities 111B 350 μm to 355 μm, and the diameter of the concavities 111C 330 μm to 335 μm, the concavities 111A of the large size and the concavities 111C of the small size differ by 15 μm to 20 μm.

Next, in the same way as in the first embodiment, the disposition pattern of the concavities 111A, 111B, and 111C is not particularly limited either, provided that it is one in which one concavity of each kind 111A, 111B, and 111C is repeatedly disposed in order in at least the first direction.

For example, as shown in FIG. 6B, in the screen 101, the disposition pattern may be set in such a way that one concavity of each kind 111A, 111B, and 111C is repeatedly disposed in order in the first direction which is the up-down direction, and concavities of each kind 111A, 111B, and 111C are consecutively disposed in the second direction perpendicular to the first direction.

Also, as shown in FIG. 6C, in the screen 101, the disposition pattern may be set in such a way that a column in which a set of concavities 111A, 111B, and 111C aligned one each in this order from the top is repeatedly disposed in the first direction which is the up-down direction, and a column in which a set of concavities 111C, 111B, and 111A aligned one each in this order from the top is repeatedly disposed in the first direction, are aligned alternately.

In the same way as in the first embodiment, according to the alignment of FIG. 6B, it is possible to further reduce the scintillation particularly in the first direction and, according to the alignment of FIG. 6C, it is possible to reduce the scintillation in both the first and second directions.

By disposing the concavities in this way, in the screen 101, as no concavities 111A, 111B, or 111C of the same curvature are adjacent, the interference of the reflected lights from the concavities 111A, 111B, and 111C is eliminated. Consequently, it is possible to dramatically reduce the occurrence of the scintillation as a whole too.

2-2. Screen Manufacturing Method

Next, a description will be given of a screen manufacturing method according to the embodiment. In the embodiment too, the screen is manufactured using a mold, and the mold is manufactured using an original plate. Hereafter, a description will be given of an original plate molding process according to the embodiment. As the material and the like are the same as those in the first embodiment, a description is omitted here.

2-2-1. Original Plate Molding Method

FIGS. 7A to 8H are fragmentary sectional views for illustrating the original plate molding process.

In the original plate molding process, firstly, a mask membrane forming process is carried out.

Figure 7A:
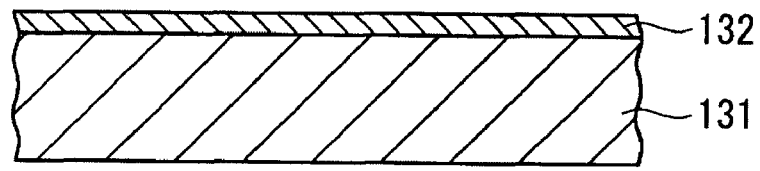
FIGS. 7A to 7D are fragmentary sectional views for illustrating an original plate molding process (first half) in the second embodiment.

In the mask membrane forming process, as shown in FIG. 7A, a mask membrane 132 is formed on one surface (a smooth surface) of a pre-molded original plate 131.

An initial hole forming process is carried out, followed by the mask membrane forming process.

Figure 7B:
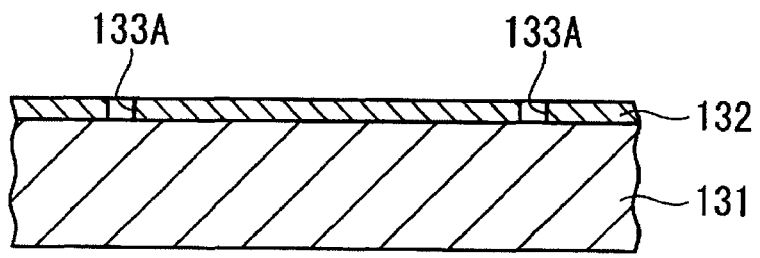

In the initial hole forming process, as shown in FIG. 7B, a multitude of openings 133A are formed in the mask membrane 132 formed on the original plate 131.

In the embodiment, as the substrate of the screen is formed by transferring the mold manufactured by transferring the original plate 131, the first openings 133A have a disposition pattern in common with the heretofore described concavities 111A.

A first etching process is carried out, followed by the initial hole forming process.

Figure 7C:
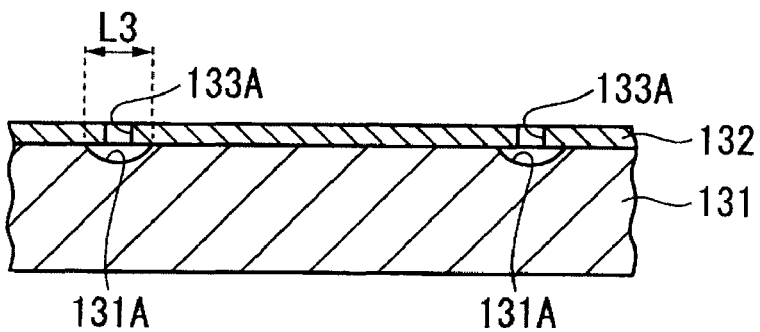

In the first etching process, as shown in FIG. 7C, the one surface side of the original plate 131 is wet etched up to a predetermined stage.

The original plate 131 is etched by an etchant coming in from the openings 133A, and a multitude of first concavities 131A are formed in accordance with the disposition pattern of the openings 133A. This etching being an isotropic etching, the concavities 131A are formed in an approximately hemispherical shape. Also, in the same way as in the first embodiment, the concavities 131A are formed so that all of their hemisphere diameters are equal, and all of their curvatures are equal. For example, in the first etching, as the predetermined stage, the original plate 131 is etched until a hemisphere diameter L3 of the concavities 131A reaches 15 μm to 20 μm, and the depth thereof reaches 7.5 μm to 10 μm. In the embodiment, with the screen manufacturing method, a processing up to this condition is called a first concavity forming step.

Next, an additional hole forming process and a second etching process are sequentially carried out.

Figure 7D:
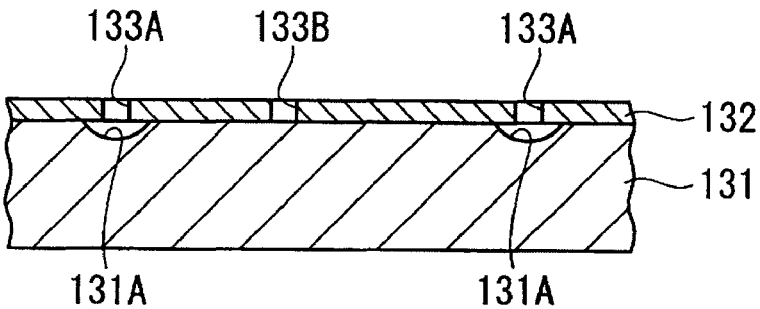

In the additional hole forming process, as shown in FIG. 7D, a multitude of second openings 133B are formed in the mask membrane 132 on the original plate 131 while avoiding the first openings 133A.

In the embodiment, the second openings 133B have a disposition pattern in common with the heretofore described concavities 111B.

Figure 8E:
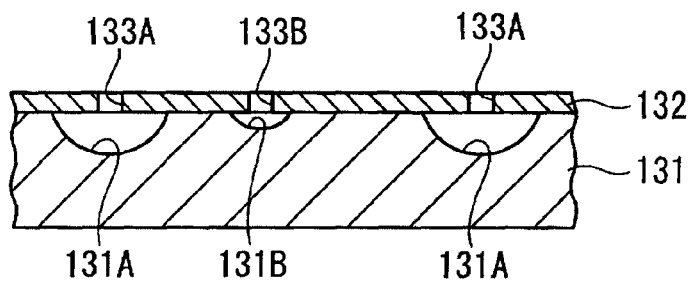
FIGS. 8E to 8H are fragmentary sectional views for illustrating the original plate molding process (second half).

In the second etching process, as shown in FIG. 8E, the one surface side of the original plate 131 is wet etched again up to a predetermined stage. By this means, a multitude of second concavities 131B are newly formed in accordance with the disposition pattern of the openings 133B. The concavities 131B are also formed so that all of their surface curvatures are equal.

Also, the etching of the first concavities 131A having progressed further than earlier, the hemisphere diameter becomes larger, and the depth becomes greater. That is, the concavities 131A are formed to be larger than the concavities 131B by the amount of the first etching. As the hemisphere diameter of the concavities 131A is larger than the hemisphere diameter of the concavities 131B, the surface curvature differs between the concavities 131A and concavities 131B. In the embodiment, with the screen manufacturing method, a processing up to this condition is called a second concavity forming step.

In the embodiment, a repeat additional hole forming process and a third etching process are sequentially carried out, followed by the second etching process.

Figure 8F:
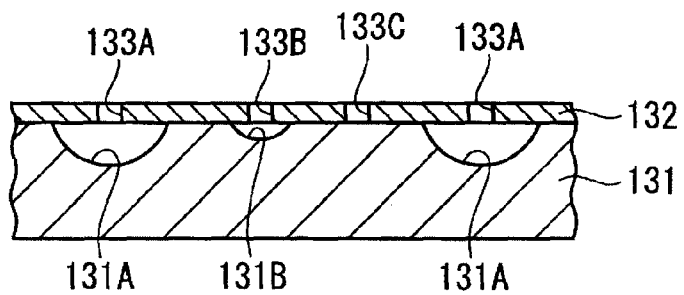

In the repeat additional hole forming process, as shown in FIG. 8F, a multitude of third openings 133C are formed in the mask membrane 132 on the original plate 131 while avoiding the openings 133A and 133B.

After forming the openings 133C, the multitude of openings 133A, 133B, and 133C are formed in the mask membrane 132 in such a way that all of the openings of each kind are of a uniform shape and size.

In the embodiment, the third openings 133C have a disposition pattern in common with the heretofore described concavities 111C. That is, as with the pattern in which one concavity of each kind 111A, 111B, and 111C is repeatedly disposed in order, one opening of each kind 133A, 133B, and 133C is formed in such a way as to be repeatedly disposed in order.

Figure 8G:
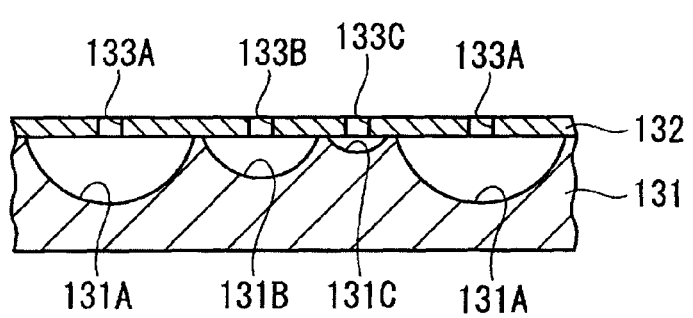

In the third etching process, as shown in FIG. 8G, the one surface side of the original plate 131 is wet etched again up to a predetermined stage. By this means, a multitude of third concavities 131C are newly formed in accordance with the disposition pattern of the third openings 133C. The concavities 131C are also formed so that all of their surface curvatures are equal.

Also, the etching of the concavities 131A and 131B having progressed further than earlier, the hemisphere diameter becomes larger, and the depth becomes greater. That is, the first concavities 131A are formed to be larger than the concavities 131B and 131C by the amount of the first and second etchings, and the second concavities 131B are formed to be larger than the concavities 131C by the amount of the second etching. As the hemisphere diameter of the concavities 131A is larger than the hemisphere diameter of the concavities 131B, and the hemisphere diameter of the concavities 131B is larger than the hemisphere diameter of the concavities 131C, the surface curvature differs among the concavities 131A, 131B, and 131C.

Figure 8H:
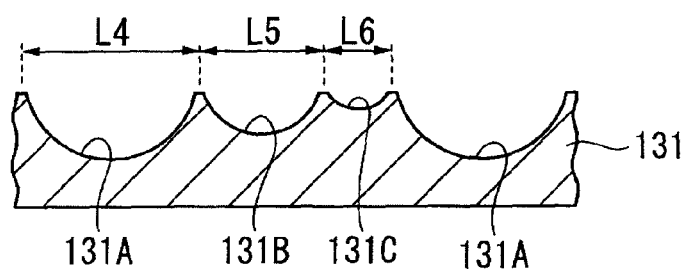
Figure 9:
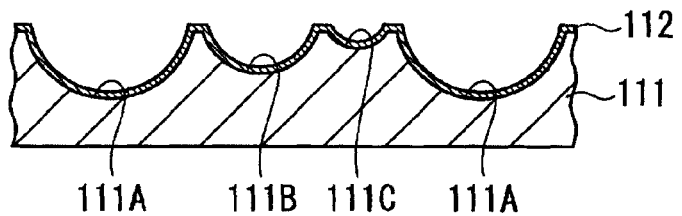
FIG. 9 is a fragmentary sectional view showing a configuration of a screen of the second embodiment.

An etching is performed by the third etching process up to a predetermined stage in which concavities 131A, 131B, and 131C are adjacent to each other. For example, in this third etching, as shown in FIG. 8H, as the predetermined stage, an etching is performed until a hemisphere diameter L4 of the concavities 131A reaches 370 μm, a hemisphere diameter L5 of the concavities 131B reaches 350 μm to 355 μm, and a hemisphere diameter L6 of the concavities 131C reaches 330 μm to 335 μm. By this means, the diameters of the concavities 111A, 111B, and 111C of the substrate of the screen, to be manufactured afterward, also reach 370 μm, 350 μm to 355 μm, and 330 μm to 335 μm respectively. In the embodiment, with the screen manufacturing method, a processing up to this condition is called a third concavity forming step.

A mask membrane removing process is carried out, followed by the third etching process.

In the mask membrane removing process, as shown in FIG. 8H, all the mask membrane 132 on the original plate 131 is removed, and the original plate 131 is washed and dried.

By the heretofore described means, the original plate 131 in which the hemispherical concavities 131A, 131B, and 131C differing in curvature are formed is molded on the one surface.

Next, the screen is manufactured by a mold manufacturing process and screen molding process the same as those in the first embodiment. As only the shape of the concavities differs from the first embodiment, a description of these processes is omitted here.

By the heretofore described means, the hemispherical concavities 111A, 111B, and 111C differing in curvature are formed on one surface of a substrate 111, and furthermore, the screen 101 with the reflective film 112 formed on the concavities 111A, 111B, and 111C is manufactured. In the embodiment, with the screen manufacturing method, a processing up to this condition is called a screen molding step.

2-3. Working Effects of Second Embodiment

According to the embodiment, as well as working effects the same as those of the first embodiment being performed, the following working effects are performed.

By providing three kinds of surface curvature to the concavities formed on the substrate 111 of the screen 101, it is possible to prevent the occurrence of the scintillation to an extent at which it has no effect on the original reflection characteristics. Also, by gradually changing the optical path differences, it is possible to provide greater optical path differences.

Also, another plurality of new openings 133C are formed in the mask membrane 132 after the second concavity forming step and before the screen molding step, and an isotropic etching is performed on the molding surface of the original plate 131 through all of the openings 133A, 133B, and 133C of the mask membrane 132 up to a predetermined stage, meaning that it is possible to form on the molding surface of the original plate 131 another plurality of new concavities 131C differing in surface curvature from the plurality of concavities 131A and 131B formed by the first concavity forming step and second concavity forming step. Because of this, it is possible to form the concavities 111A, 111B, and 111C of three kinds of surface curvature on the substrate 111 configuring the manufactured screen. By this means, by gradually changing the optical path differences, it is possible to provide greater optical path differences.

MODIFICATION EXAMPLES

The invention is not limited to the heretofore described embodiments.

For example, the screens 1 and 101 not being limited to ones which reflect the projection light of the proximity projection type projector 2, it is sufficient that they are ones used for reflecting the projection light and projecting the image.

Also, in the heretofore described embodiments, the concavities with the approximately hemispherical surfaces are formed on the reflecting surface side of the screen but, the shape of the concavities not being limited to this, concavities having another curved surface of a curved shape in section, a U-shape in section, or the like, may be formed.

Furthermore, not being limited to the concavities, even a screen on the reflecting surface side of which are formed convexities having a curved surface can be applied. For example, as in a reflective screen 200 shown in FIG. 10, it is sufficient to configure including a substrate 211 on the reflecting surface of which are formed convexly curved surface portions 211A and 211B, and a reflective film 212 formed on the substrate 211.

Herein, in the same way as the concavities 11A and 11B of the first embodiment, the curved surface portions 211A and 211B, whose surface curvatures differ one from the other, are disposed alternately in at least the up-down direction which is the first direction.

By using the original plate 31 shown in FIG. 3F of the first embodiment as a mold, it is possible to mold the substrate 211 having two kinds of convexly curved surface portion 211A and 211B.

Also, for example, the disposition pattern of the concavities and convexities, that is, of the curved surface portions, in each embodiment and modification example is not limited to that of each heretofore described embodiment.

FIGS. 11A to 11D show other specific examples of the disposition patterns of the concavities (concavities 11A and 11B having the curved surfaces of two kinds of curvature) of the first embodiment. FIGS. 11A to 13C, as with FIGS. 2A and 6A, are examples of disposition patterns in the first direction of the screen.

Figure 11A:
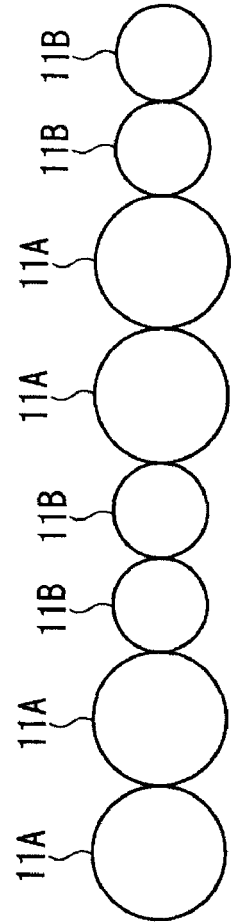
FIGS. 11A to 11D are top views showing specific examples of disposition patterns of concavities (two kinds) in the modification example.

In FIG. 11A, two each of the concavities 11A and concavities 11B are disposed alternately: the concavity 11A, concavity 11A, concavity 11B, concavity 11B, concavity 11A, concavity 11A, concavity 11B, concavity 11B, and so on.

In this way, by disposing two each of the concavities 11A and concavities 11B alternately, there is a possibility that the interference of the reflected lights occurs in portions in which concavities 11A or concavities 11B are adjacent one to the other. In contrast, in portions in which concavities 11A and concavities 11B are adjacent, as the surface curvatures differ, it is possible to suppress the interference of the reflected lights. Consequently, it is possible to reduce the scintillation as a whole.

Figure 11B:
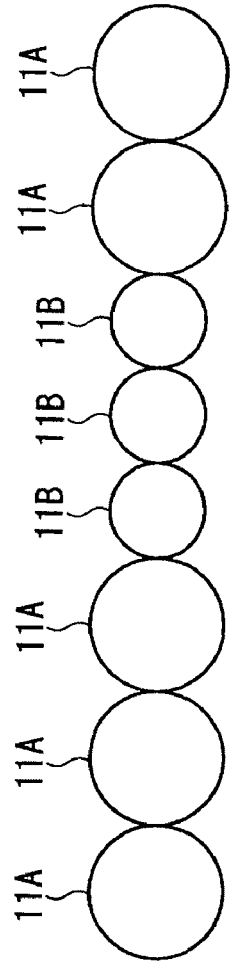

In FIG. 11B, three each of the concavities 11A and concavities 11B are disposed alternately: the concavity 11A, concavity 11A, concavity 11A, concavity 11B, concavity 11B, concavity 11B, concavity 11A, concavity 11A, concavity 11A, and so on.

In this way, when disposing three each of the concavities 11A and concavities 11B alternately, it is possible to reduce the scintillation more than when aligning the same concavities, although it is ineffective in comparison with the patterns of each heretofore described embodiment and FIG. 11A. In this way, even when curved surface portions of the same curvature are disposed in series of three, it is possible to suppress the occurrence of the scintillation more than when the ones aligned are all the same. That is, in the invention, it is sufficient that the curved surface portions of the same curvature are disposed in series of up to three.

Figure 11C:
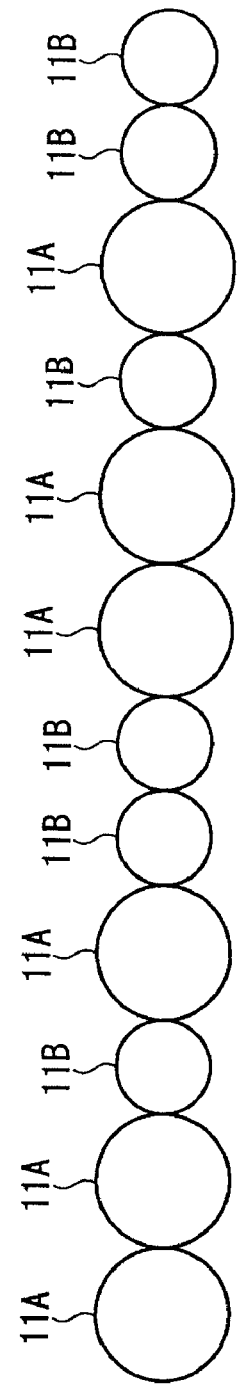

In FIG. 11C, two concavities 11A and two concavities 11B, and one concavity 11A and one concavity 11B, are disposed alternately: the concavity 11A, concavity 11A, concavity 11B, concavity 11A, concavity 11B, concavity 11B, concavity 11A, concavity 11A, concavity 11B, and so on.

Figure 11D:
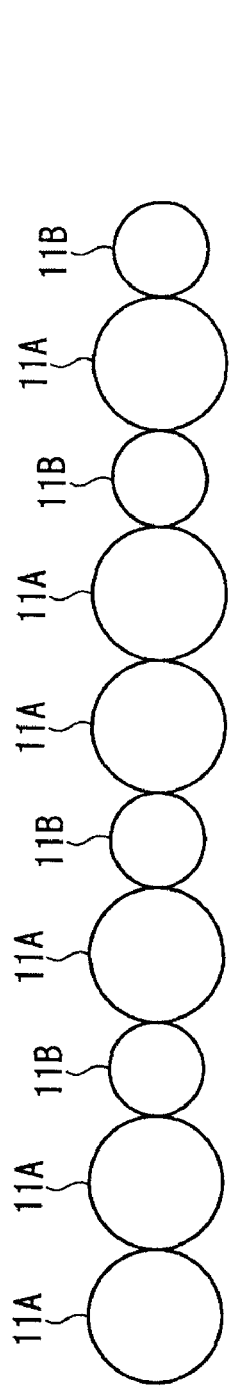

Also, in FIG. 11D, two concavity 11A, one concavity 11B, one concavity 11A, and one concavity 11B are repeatedly disposed in this order: the concavity 11A, concavity 11A, concavity 11B, concavity 11A, concavity 11B, concavity 11A, concavity 11A, concavity 11B, concavity 11A, and so on.

In these cases of FIGS. 11C and 11D too, as the heretofore described patterns are combined, it is possible to reduce the scintillation as a whole.

The disposition patterns shown in FIGS. 11A to 11D being only specific examples, in the event that a disposition configuration is such that the concavities of each curvature 11A and 11B are disposed in series of up to three, it is possible to reduce the occurrence of the scintillation, and it is possible to suppress a glare. In particular, in the event that a disposition configuration is such that the concavities of each curvature 11A and 11B are disposed in series of up to two, it is possible to drastically reduce the occurrence of the scintillation, and it is possible to suppress the glare.

Herein, it is sufficient that the series of up to three curved surface portions are in an alignment in at least one direction (the first direction) such as the vertical direction or a lateral direction.

For example, when the projection light is projected from the up-down direction of the central portion of the screen, the scintillation is likely to occur in the lateral direction. Because of this, it is preferable, in accordance with the position of the light source, to apply the alignment in a direction (in this case, the lateral direction) in which the scintillation is likely to occur.

Also, this direction not having to be straight, for example, when the projection light of the projector or the like is projected onto the reflecting surface at an acute angle from the lower side of the center of the screen, a case is conceivable in which concavities of the same diameter are arranged radially in accordance with how the projection light spreads over the reflecting surface due to the acute angle. In this case, for example, the concavities are disposed in such a way that a pitch at which they are arranged is longer in the vertical direction than in the lateral direction. Specifically, the shorter pitch is taken to be 165 μm, and the longer pitch 240 μm.

In this kind of case, as the scintillation is likely to occur in the radial direction, by limiting the number of curved surface portions of the same curvature disposed in series to a maximum of three in at least the radial direction or lateral direction, it is possible to drastically reduce the scintillation.

Also, in the second embodiment, as the concavities have the curved surfaces of three kinds of curvature, it is possible to provide still more disposition patterns.

FIGS. 12A to 13C show other disposition pattern examples of the concavities (concavities 111A, 111B, and 111C) of the second embodiment.

Figure 12A:
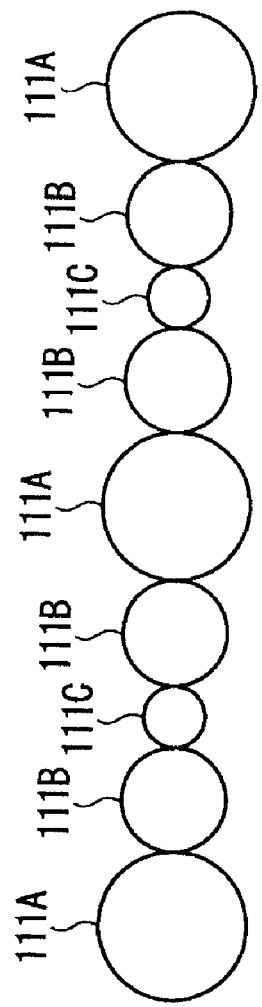
FIGS. 12A to 12C are top views showing specific examples 1 of disposition patterns of concavities (three kinds) in the modification example.

In FIG. 12A, the concavities 111A, 111B, and 111C are disposed in the order of large, medium, small, medium, large, and so on, in size: the concavity 111A, concavity 111B, concavity 111C, concavity 111B, concavity 111A, and so on.

By disposing the concavities in this way, no concavities of the same curvature are adjacent, and each concavity 111B is disposed in every second position sandwiching one of the other concavities 111A and 111C, but the concavities 111A and concavities 111C are disposed in every fourth position sandwiching three other concavities. Also, as the differences in curvature among the concavities are the same, it is possible to drastically reduce the scintillation.

Figure 12B:
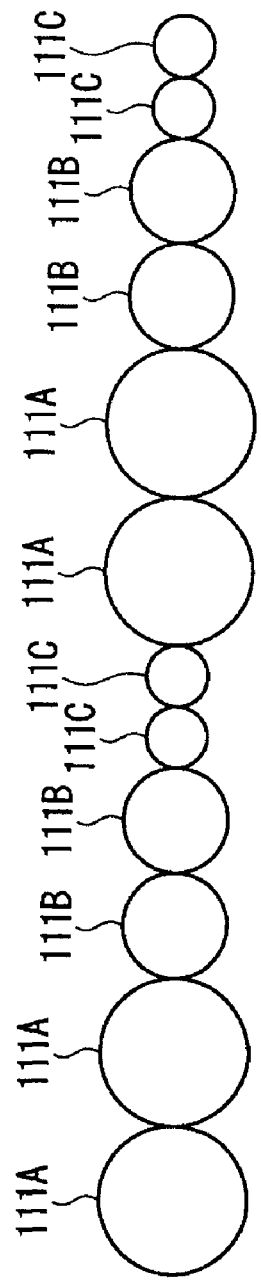

In FIG. 12B, the concavities 111A, 111B, and 111C are disposed in the order of large, large, medium, medium, small, small, large, large, and so on, in size: the concavity 111A, concavity 111A, concavity 111B, concavity 111B, concavity 111C, concavity 111C, concavity 111A, concavity 111A, and so on.

By disposing the concavities in this way, as each concavity is of the same curvature as one of two concavities adjacent to the each concavity, there is a possibility that interference occurs among the lights reflected by these adjacent concavities.

As opposed to this, the other concavity differs in curvature from the each concavity, and four other concavities differing in curvature from the each concavity are disposed in the direction of the other concavity. That is, as pairs of concavities of the same curvature aligned side by side are sequentially disposed sandwiching four concavities of the differing curvatures, it is possible to reduce the scintillation.

Figure 12C:
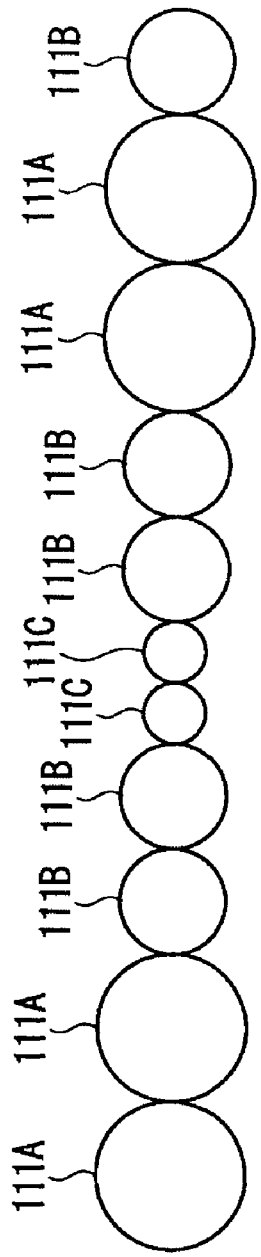

In FIG. 12C, the concavities 111A, 111B, and 111C are disposed in the order of large, large, medium, medium, small, small, medium, medium, and so on, in size: the concavity 111A, concavity 111A, concavity 111B, concavity 111B, concavity 111C, concavity 111C, concavity 111B, concavity 111B, and so on.

By disposing the concavities in this way, as pairs of concavities of the same curvature aligned side by side are sequentially disposed sandwiching two concavities or six concavi ties of the differing curvatures, it is possible to reduce the scintillation.

Figure 13A:
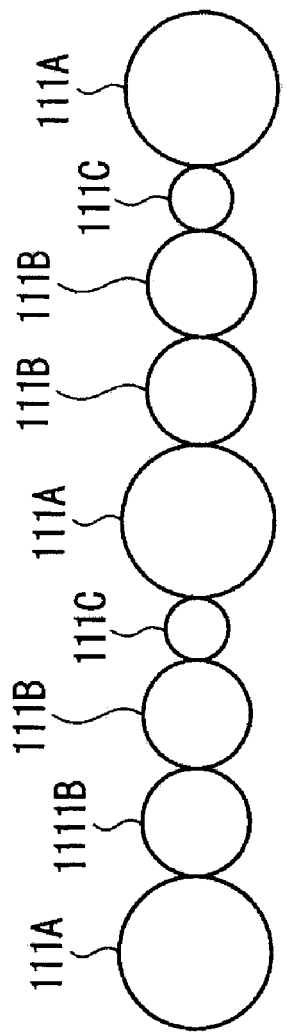
FIGS. 13A to 13C are top views showing specific examples 2 of disposition patterns of concavities (three kinds) in the modification example.

In FIG. 13A, the concavities 111A, 111B, and 111C are disposed in such a way as to repeat the basic pattern of large, medium, medium, and small in size: the concavity 111A, concavity 111B, concavity 111B, concavity 111C, concavity 111A, and so on.

Figure 13B:
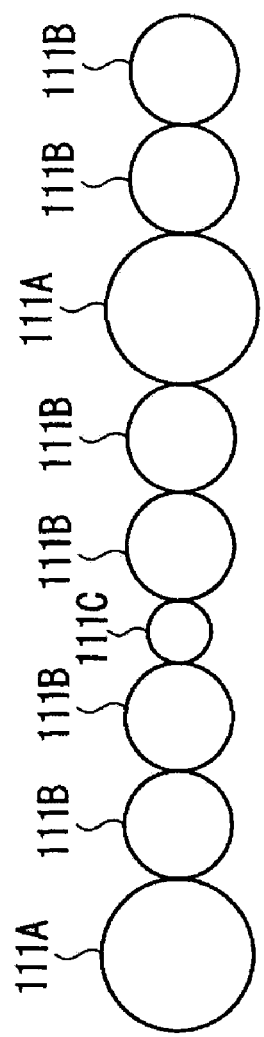

Also, in FIG. 13B, the concavities 111A, 111B, and 111C are disposed in such a way as to repeat the basic pattern of large, medium, medium, small, medium, and medium in size: the concavity 111A, concavity 111B, concavity 111B, concavity 111C, concavity 111B, concavity 111B, and so on.

In these dispositions, there are portions in which two concavities are adjacent one to the other but, in the other portions, concavities differing in curvature are adjacent, meaning that it is possible to reduce the scintillation as a result.

Figure 13C:
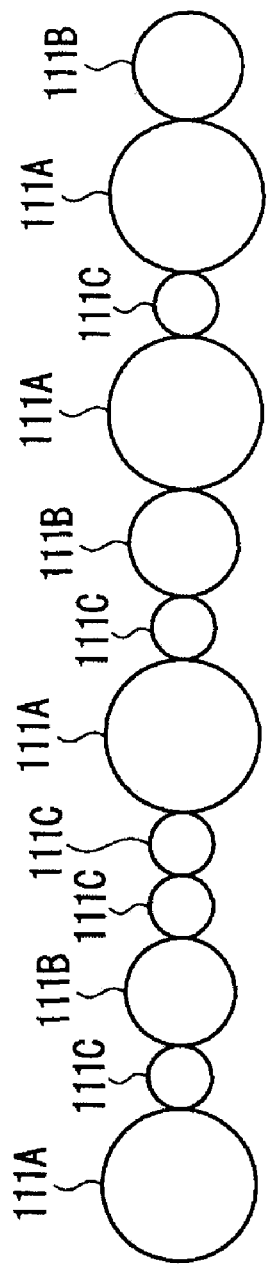

In the event that a disposition is such that the concavities 111A, concavities 111B, or concavities 111C are disposed in series of up to three, preferably, up to two, as heretofore described, it is possible to drastically reduce the occurrence of the scintillation even in the event of the kind of random disposition shown in FIG. 13C.

Also, even in the event of a disposition in which the heretofore described basic patterns are combined, or the like, it is possible to reduce the occurrence of the scintillation.

Also, the molding of the screen not being limited to a molding with the mold, with the original plate 31 and 131 as molds, the screens 1 and 101 may be directly molded using the molding surfaces of the original plates 31 and 131.

Furthermore, rather than forming the openings 33B and 133C, and the like, after forming the mask membranes 32 and 132 on the original plates 31 and 131, the mask membranes 32 and 132 in which the openings 33B and 133C, or the like, are provided in advance may be formed in advance on the original plates 31 and 132. These forming methods are not particularly limited.

Also, the formation of the reflective films 12 and 112 not being limited to a formation all over the concavities, with reflection characteristics in mind, the reflective films 12 and 112 may be partially formed in accordance with a direction of incidence of the projection light in such a way that contrast is improved.

Figure 10:
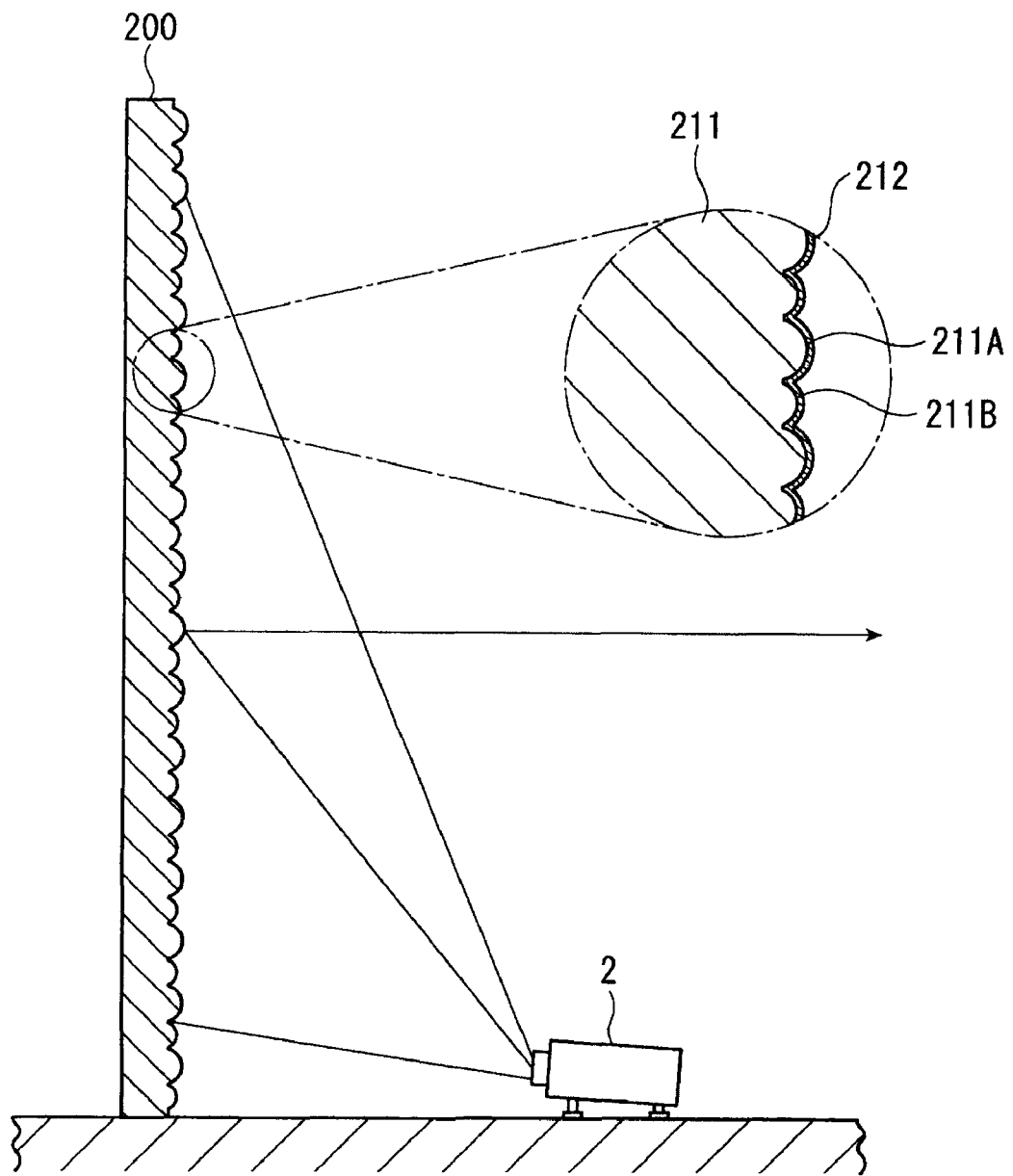
FIG. 10 is a diagram showing an image projection system in a modification example.
Figure 14:
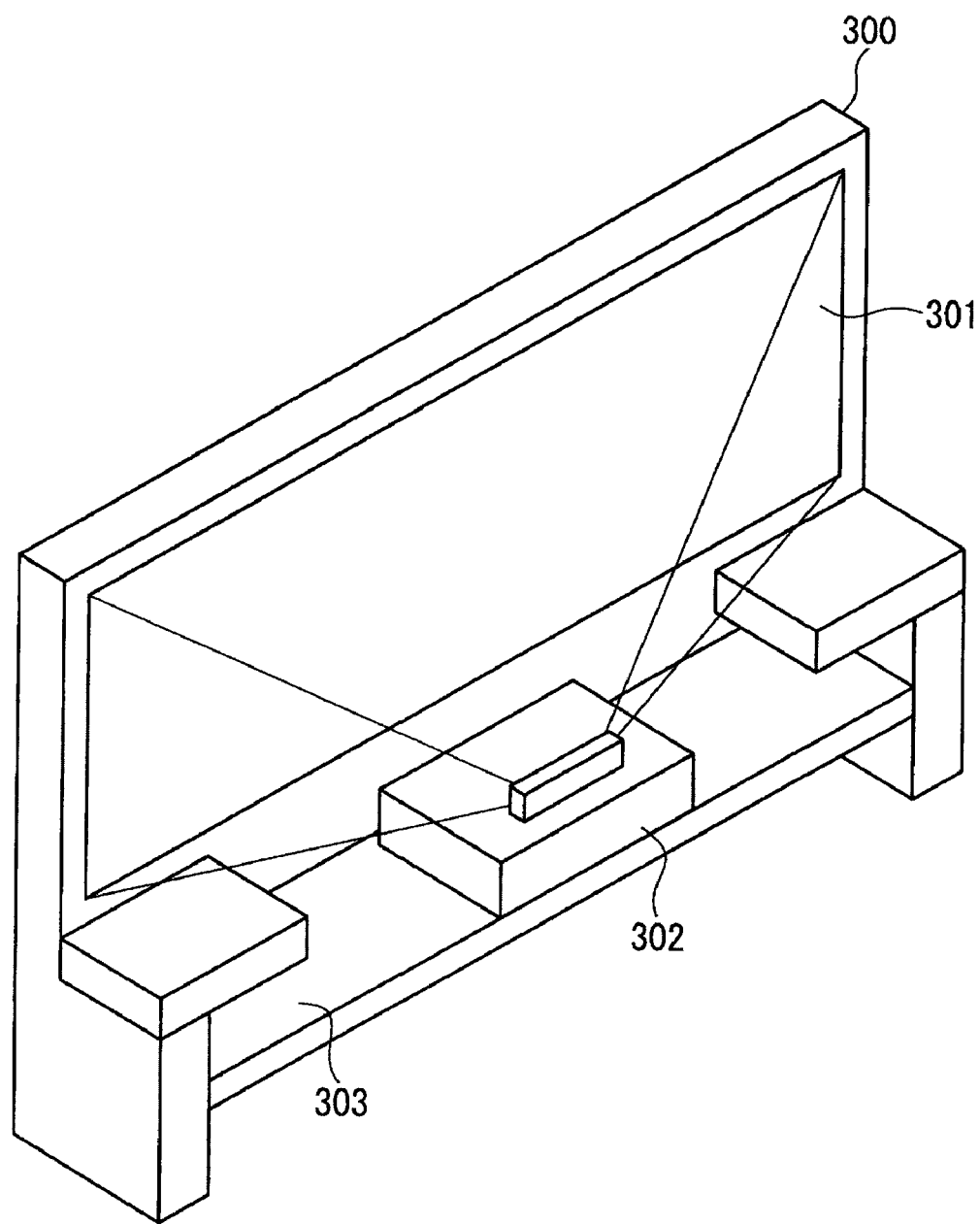
FIG. 14 is a perspective view showing a front projection television in the modification example.

Also, the reflective screen of some aspects of the invention is not limited to ones used in the types of projection system shown in FIGS. 1 and 10. It may be applied to, for example, a front projection television 300 including a reflective screen 301, a projector 302, and a frame 303 supporting them, as shown in FIG. 14.

The entire disclosure of Japanese Patent Application No: 2009-096245, filed Apr. 10, 2009 and No: 2010-050209, filed Mar. 8, 2010 are expressly incorporated by reference herein.

What is claimed is:

1. A reflective screen which reflects projection light, comprising:
a substrate on which a plurality of curved surface portions are formed; and
a reflective film formed on the plurality of curved surface portions of the substrate, wherein
the plurality of curved surface portions are in concave or convex shapes with several different curvatures including a largest curvature portion having a largest curvature and a smallest curvature portion having a smallest curvature,
a first pattern of the plurality of curved surface portions is aligned in a first direction, the largest curvature portion to the smallest curvature portion are aligned in a first curvature size order in the first pattern and are repeatedly provided in the first direction,
a second pattern of the plurality of curved surface portions is aligned in the first direction, the smallest curvature portion to the largest curvature portion are aligned in a second curvature size order in the second pattern and are repeatedly provided in the first direction, and
the first pattern and the second pattern are alternatively provided.

2. The reflective screen according to claim 1, wherein the largest curvature portion is provided next to the smallest curvature portion in a second direction perpendicular to the first direction.

3. The reflective screen according to claim 1, wherein the largest curvature portion is provided at an end of the first pattern at an edge of the substrate.

4. The reflective screen according to claim 1, wherein the plurality of curved surface portions are concave curved surface portions, and
positions of the outer circumferential edges of openings of the concave curved surface portions coincide with each other in a thickness direction of the substrate.

5. The reflective screen according to claim 1, wherein the plurality of curved surface portions are configured with two or three kinds of different curvatures.

6. A projection system comprising:
the reflective screen according to claim 1; and
projection equipment which projects light onto a surface of the reflective screen.

7. A front projection television comprising:
the reflective screen according to claim 1;
a projection unit which projects light onto a surface of the reflective screen; and
a housing in which the reflective screen and projection unit are provided.

8. The reflective screen according to claim 1, wherein the smallest curvature portion is provided at an end of the second pattern at an edge of the substrate.

* * * * *